(12) United States Patent
Fujimori et al.

(10) Patent No.: US 6,925,484 B2
(45) Date of Patent: Aug. 2, 2005

(54) DYNAMIC PROXY SERVER APPARATUS

(75) Inventors: Hideki Fujimori, Hiroshima (JP); Tetsuji Sumita, Hiroshima (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 738 days.

(21) Appl. No.: 09/821,525

(22) Filed: Mar. 29, 2001

(65) Prior Publication Data

US 2001/0037389 A1 Nov. 1, 2001

(30) Foreign Application Priority Data

Mar. 29, 2000 (JP) ........................................ 2000-090337

(51) Int. Cl.⁷ .............................................. G06F 13/00
(52) U.S. Cl. ..................................................... 709/202
(58) Field of Search .............................. 709/200, 202, 709/203, 217, 281, 219, 225

(56) References Cited

U.S. PATENT DOCUMENTS 6,003,082 A   12/1999  Gampper et al. ........... 709/225
6,212,560 B1 *  4/2001  Fairchild .................... 709/223

OTHER PUBLICATIONS

Fielding R. et al.; "RFC 2616: Hybertest Transfer Protocol—HTTP/1.1" IETF RFC2616, Jun. 1999.

Schilit B.N. et al.; "TeleWeb: Loosely connected access to the World Wide Web" Computer Networks and ISDN Systems, North Holland Publishing, Amsterdam, NL, vol. 28, No. 11, May 1, 1996, pp 1431–1444.

Fahmi H. et al; "Distributed framework for real–time multimediaobject communication" Object–Oriented Real–Time Distributed Computing 2000 Proceedigs, Third IEEE International Symposium in Newport, CA USA Mar. 15–17, 2000, Los Alamitos, CA IEEE Comput SOC Mar. 15 2000 pp 252–259.

\* cited by examiner

*Primary Examiner*—Robert B. Harrell

(57) ABSTRACT

A proxy server apparatus receives a resource obtainment request from a client terminal apparatus, creates, from the received resource obtainment request, divisional get requests that specify resource obtainment ranges, and sends the divisional get requests to a web server apparatus. The proxy server apparatus includes a control unit and a management unit. The control unit creates the divisional get requests by referring to margin times and wait times managed for each request by the management unit.

39 Claims, 24 Drawing Sheets

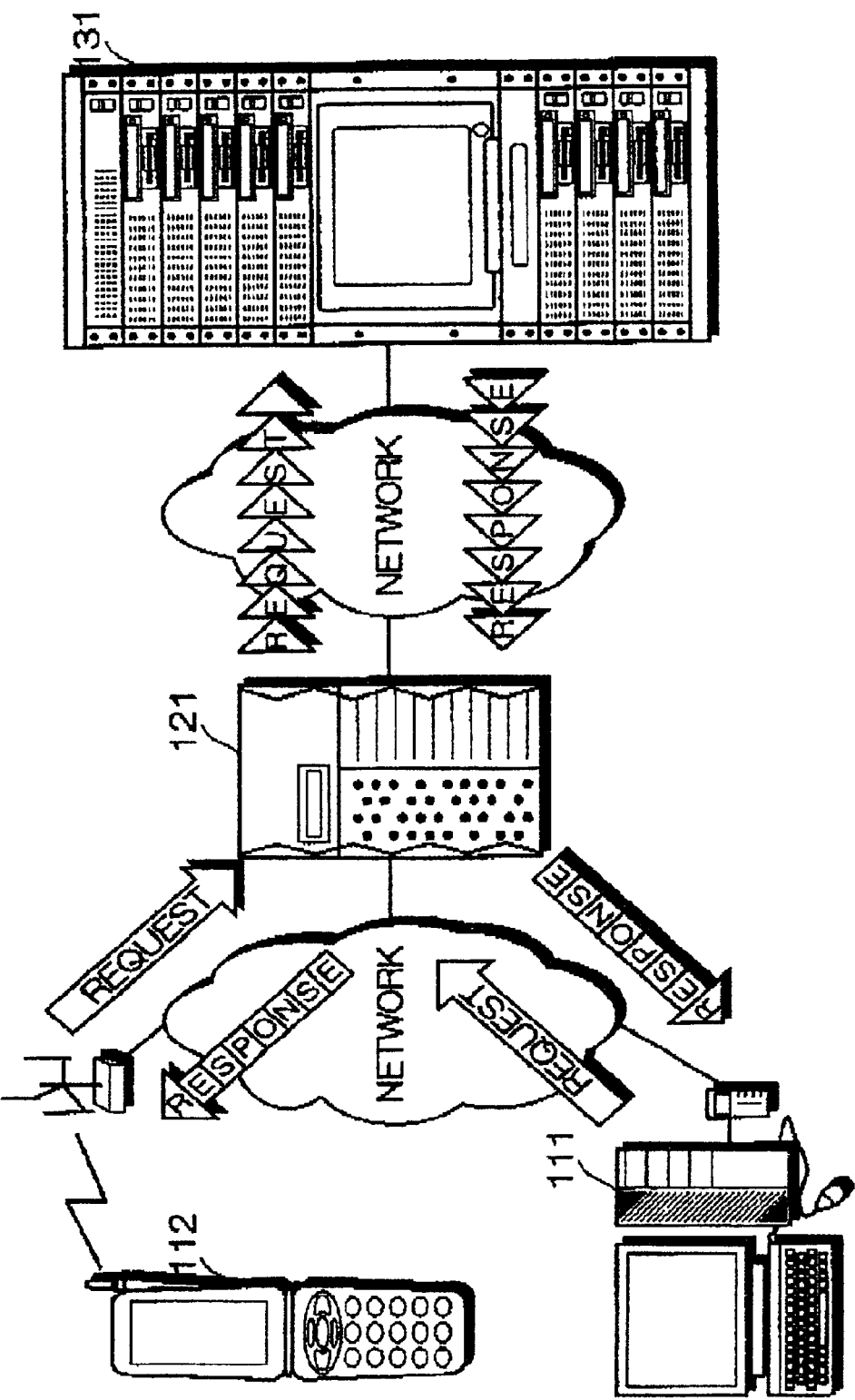

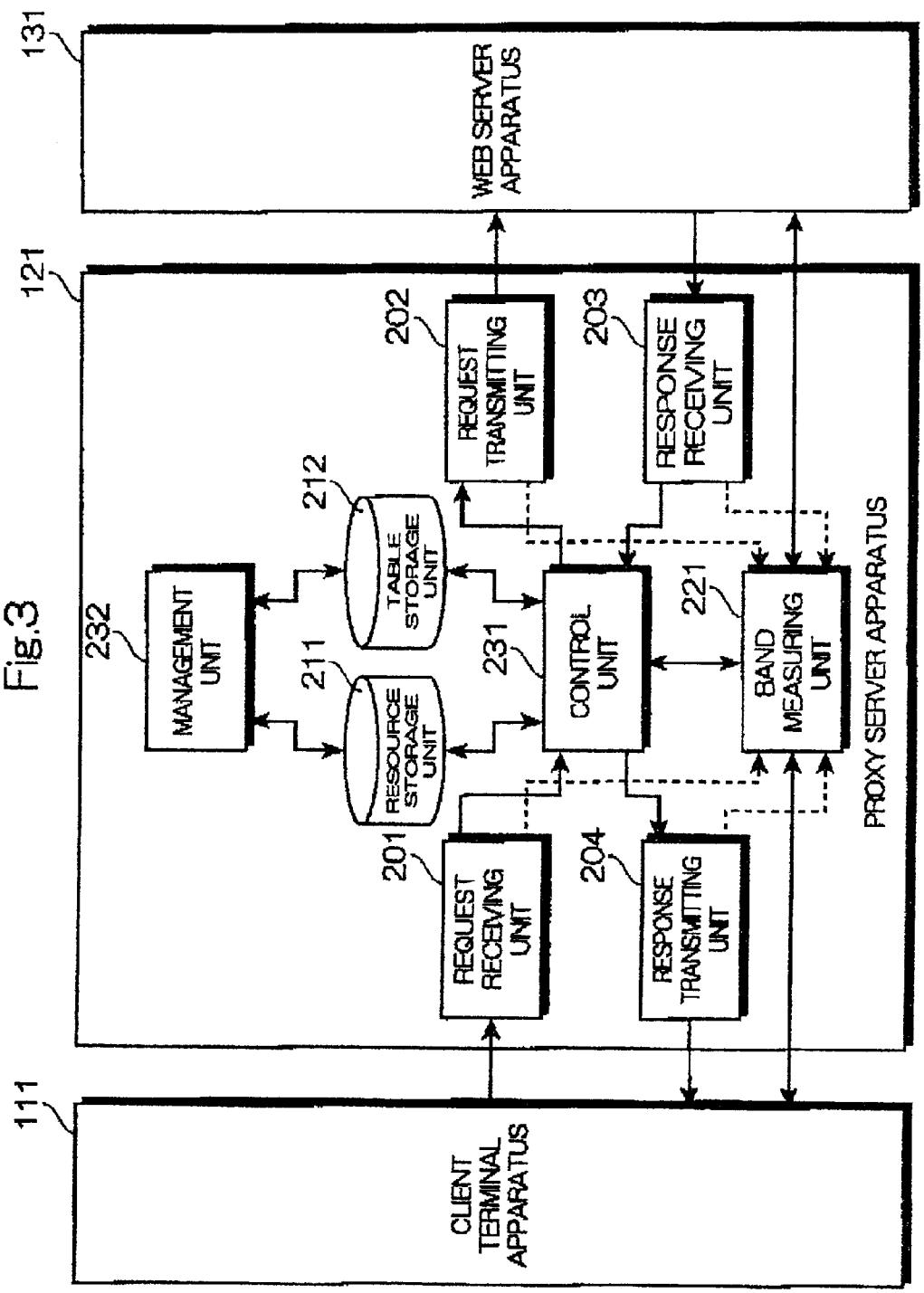

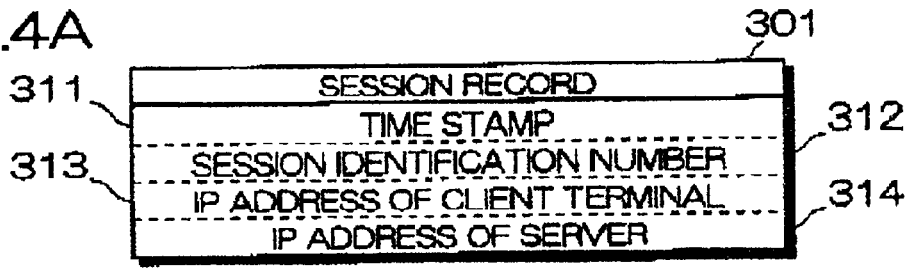

Fig.4A

| 301 SESSION RECORD | |
|---|---|
| 311 | TIME STAMP / 312 |
| 313 | SESSION IDENTIFICATION NUMBER |
|  | IP ADDRESS OF CLIENT TERMINAL / 314 |
|  | IP ADDRESS OF SERVER |

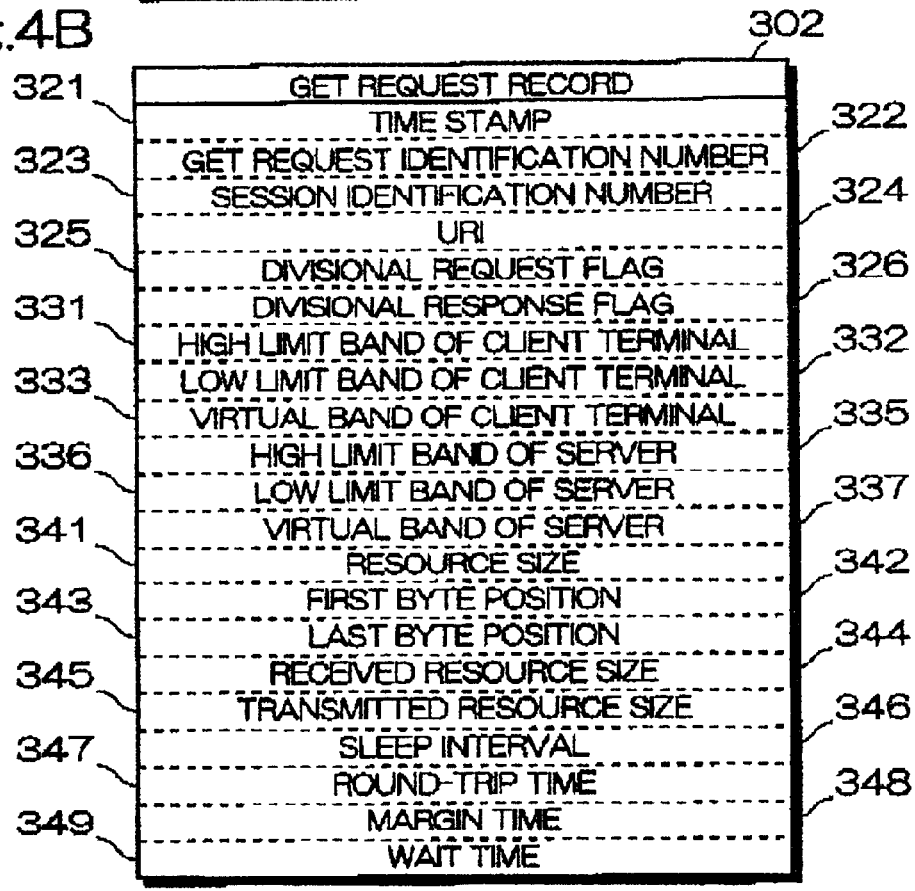

Fig.4B

| 302 GET REQUEST RECORD | |
|---|---|
| 321 | TIME STAMP / 322 |
| 323 | GET REQUEST IDENTIFICATION NUMBER |
|  | SESSION IDENTIFICATION NUMBER / 324 |
| 325 | URI |
|  | DIVISIONAL REQUEST FLAG / 326 |
| 331 | DIVISIONAL RESPONSE FLAG |
|  | HIGH LIMIT BAND OF CLIENT TERMINAL / 332 |
| 333 | LOW LIMIT BAND OF CLIENT TERMINAL |
|  | VIRTUAL BAND OF CLIENT TERMINAL / 335 |
| 336 | HIGH LIMIT BAND OF SERVER |
|  | LOW LIMIT BAND OF SERVER / 337 |
| 341 | VIRTUAL BAND OF SERVER |
|  | RESOURCE SIZE / 342 |
| 343 | FIRST BYTE POSITION |
|  | LAST BYTE POSITION / 344 |
| 345 | RECEIVED RESOURCE SIZE |
|  | TRANSMITTED RESOURCE SIZE / 346 |
| 347 | SLEEP INTERVAL |
|  | ROUND-TRIP TIME / 348 |
| 349 | MARGIN TIME |
|  | WAIT TIME |

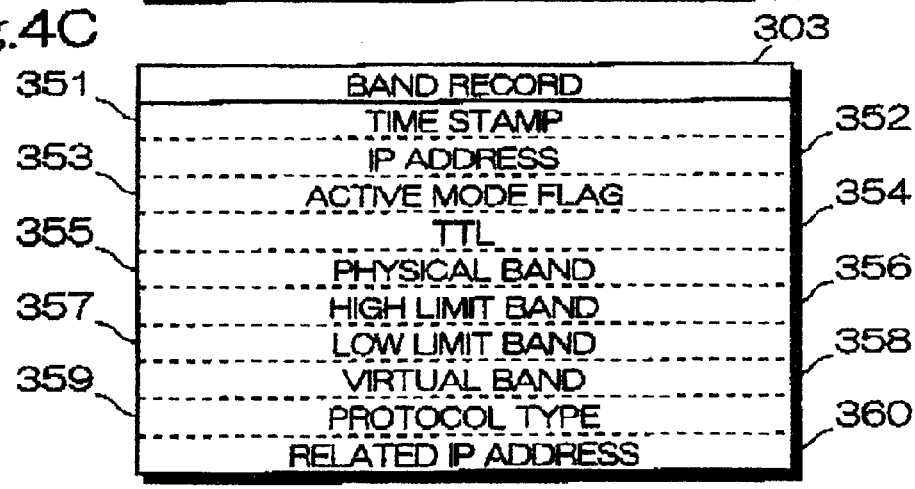

Fig.4C

| 303 BAND RECORD | |
|---|---|
| 351 | TIME STAMP / 352 |
| 353 | IP ADDRESS |
|  | ACTIVE MODE FLAG / 354 |
| 355 | TTL |
|  | PHYSICAL BAND / 356 |
| 357 | HIGH LIMIT BAND |
|  | LOW LIMIT BAND / 358 |
| 359 | VIRTUAL BAND |
|  | PROTOCOL TYPE / 360 |
|  | RELATED IP ADDRESS |

——— VIRTUAL BAND

DS : DATA SIZE
ST : SLEEP TIME
PT : SLEEP INTERVAL

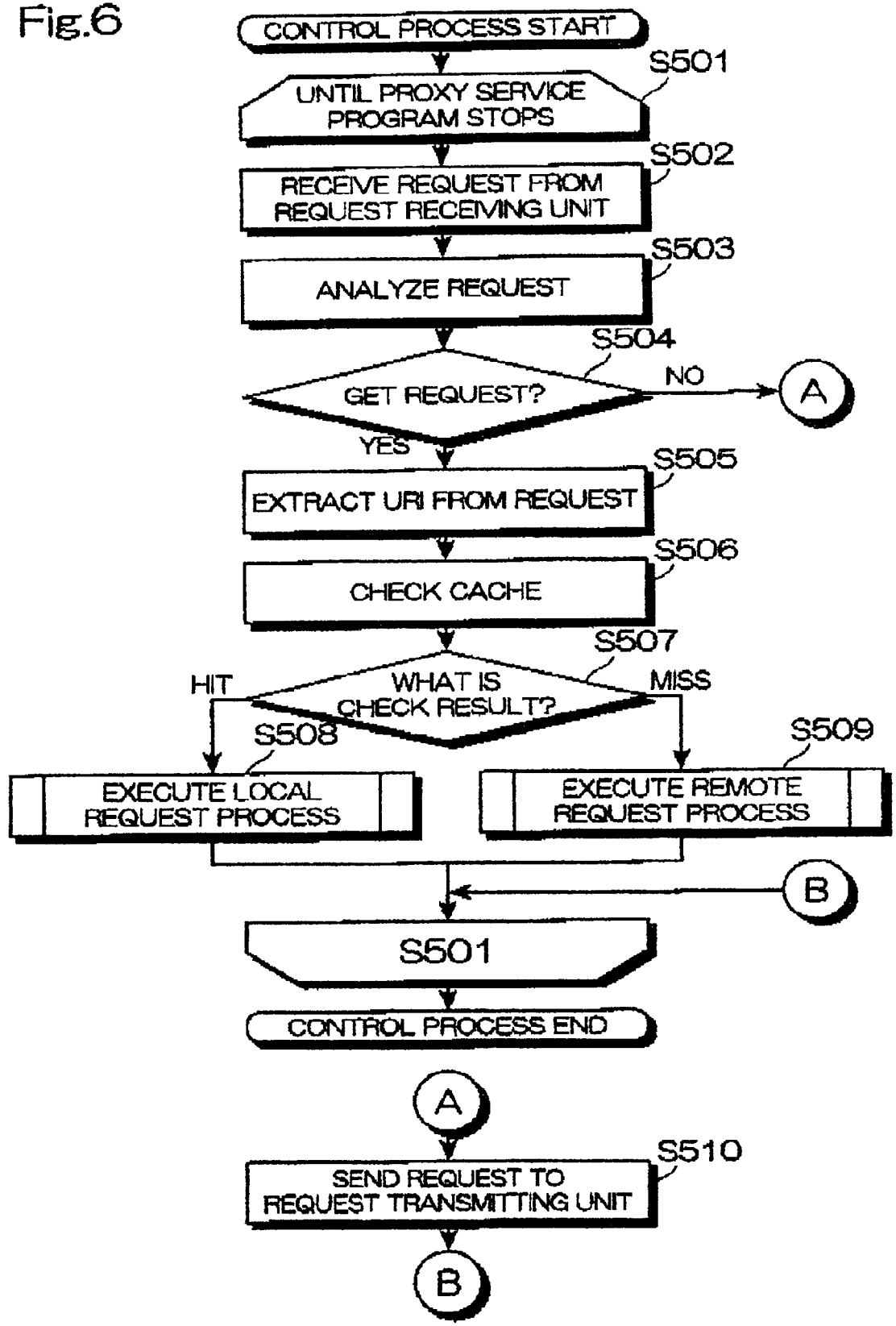

Fig.22A 2101

| TIME STAMP | SID 2102 | CA 2103 | SA 2104 |
|---|---|---|---|
| Apr 1 10:00:00 | S7BAB33C6R | 101.102.103.104 | 123.231.206.104 |
| Apr 1 10:00:25 | S126A03A4R | 201.202.203.204 | 201.202.203.200 |
| Apr 1 10:01:03 | S45FAF460R | 2d4d:cfc:0:0:4a4:3:2:11 | 3da:ca:de:bc:41:35:26:17 |
| Apr 1 10:02:07 | S006AF7F8R | 222.111.222.111 | 202.181.202.131 |
| Apr 1 10:02:12 | S987BB35AR | 101.202.101.202 | 101.202.101.242 |
| Apr 1 10:02:57 | SCB7209AAR | 2a:b1:cc:d:601:2:a03:4 | a5a:ba:cc:da:11:12:13:14 |

Fig.22B 2121

| TIME STAMP | GID 2122 | SID 2123 | URI 2124 | SRQF 2125 | MT 2148 | WT 2149 |
|---|---|---|---|---|---|---|
| Apr 1 10:00:00 | G004A2503R | S7BAB33C6R | http://www.aaa.com/index.html | 0 | 0 | 0 |
| Apr 1 10:00:25 | G122D03A4R | S126A03A4R | http://www.bbb.com/image/0001.gif | 1 | -1 | -2.4 |
| Apr 1 10:01:03 | G45FAF460R | S45FAF460R | http://www.ccc.com/movie/0002.mpg | 1 | 0.5 | 0.9 |
| Apr 1 10:01:32 | G778B33C6R | S7BAB33C6R | http://www.aaa.com/audio/aaa.aiff | 0 | 0 | 0 |
| Apr 1 10:02:07 | G006AF7F8R | S006AF7F8R | http://www.ddd.com/sound/ssss.ra | 1 | 2.4 | 1 |
| Apr 1 10:02:12 | G987BB35AR | S987BB35AR | http://www.eee.com/music/xxx.mp3 | 1 | -0.5 | 0.9 |
| Apr 1 10:02:28 | G7A4B9E03R | S7BAB33C6R | http://www.aaa.com/movie/bbb.mpg | 0 | 0 | 0 |
| Apr 1 10:02:57 | GCB7209AAR | SCB7209AAR | http://www.fff.com/bitmap/xyz.bmp | 0 | 0 | 0 |
| Apr 1 10:03:14 | G3CBAEC60R | S7BAB33C6R | http://www.aaa.com/image/ccc.gif | 0 | 0 | 0 |

——— VIRTUAL BAND IN WHICH MARGIN TIME IS TAKEN INTO ACCOUNT
- - - - VIRTUAL BAND IN WHICH MARGIN TIME IS NOT TAKEN INTO ACCOUNT

DS : DATA SIZE
ST : SLEEP TIME
PT : SLEEP INTERVAL
MT : MARGIN TIME

—·—·— VIRTUAL BAND IN WHICH WAIT TIME IS TAKEN INTO ACCOUNT
—————— VIRTUAL BAND IN WHICH WAIT TIME IS NOT TAKEN INTO ACCOUNT

DS : DATA SIZE IN WHICH WAIT TIME IS NOT TAKEN INTO ACCOUNT
DS' : DATA SIZE IN WHICH WAIT TIME IS TAKEN INTO ACCOUNT
ST : SLEEP TIME
PT : SLEEP INTERVAL
WT : WAIT TIME

DYNAMIC PROXY SERVER APPARATUS

BACKGROUND OF THE INVENTION

(1) Field of the Invention

The present invention relates to a technique for receiving a resource obtainment request from a client terminal apparatus and obtaining a resource from a server apparatus via a network and transferring the resource to the client terminal apparatus via a network, in accordance with the request.

(2) Description of Related Art

Proxy server apparatuses, after receiving resource obtainment requests from client terminal apparatuses, obtain web contents (hereinafter referred to as resources) from web server apparatuses, substituting for the client terminal apparatuses that issued the resource obtainment requests.

FIG. 1 shows how resources are obtained via a conventional proxy server apparatus.

As shown in FIG. 1, client terminal apparatuses 11 and 12, a proxy server apparatus 21, and a web server apparatus 31 are connected to each other via networks.

The client terminal apparatus 11 is a personal computer including communicating devices such as: an input device such as a keyboard; an output device such as a display; a modem; and a router.

The client terminal apparatus 12 is a mobile telephone terminal apparatus that can be connected to the Internet. Because of downsizing and cost reduction, the capacity of a semiconductor memory of the client terminal apparatus 12 is small. The client terminal apparatus 12 does not include a magnetic recording medium.

The proxy server apparatus 21 is a computer that provides a proxy service, executing a proxy service program.

The web server apparatus 31 is a computer that provides a resource distribution service, executing a web service program. Note that the web server apparatus 31 stores a lot of resources in a recording medium therein in advance.

Note that the client terminal apparatus 11, proxy server apparatus 21, and web server apparatus 31 receive/transmit resources in compliance with HTTP (HyperText Transfer Protocol) shown in RFC (Request For Comments) 2616.

The client terminal apparatus 11 obtains a resource from the web server apparatus 31 via the proxy server apparatus 21, by executing the following steps (1) to (8).

(1) The client terminal apparatus 11 sends a resource obtainment request (hereinafter referred to as get request) to the proxy server apparatus 21.

The proxy server apparatus 21 (2) receives the get request from the client terminal apparatus 11, and (3) transfers the get request to the web server apparatus 31.

The web server apparatus 31 (4) receives the get request from the proxy server apparatus 21, (5) obtains a resource specified in the get request from the recording medium storing the lot of resources, and sends the obtained resource (hereinafter referred to as get response) to the proxy server apparatus 21.

The proxy server apparatus 21 (6) receives the get response from the web server apparatus 31, and (7) transfers the get response to the client terminal apparatus 11.

(8) The client terminal apparatus 11 receives the get response from the proxy server apparatus 21.

It should be noted here that the proxy server apparatus 21 stores the obtained get response in a recording medium therein for a certain period.

It is presumed here that the data transfer speed between the client terminal apparatus 11 and the proxy server apparatus 21 is ref erred to as client band and that the data transfer speed between the proxy server apparatus 21 and the web server apparatus 31 is referred to as server band.

SUMMARY OF THE INVENTION

It is therefore an object of the present invention to provide a dynamic proxy server apparatus that preferentially obtains or transfers a resource in accordance with the state of communication.

The above object is fulfilled by a dynamic proxy server apparatus for, substituting for one of a plurality of client terminal apparatuses, obtaining a resource from a server apparatus, the dynamic proxy server apparatus comprising: a request receiving means for receiving a plurality of requests from at least one of the plurality of client terminal apparatuses; a divisional request creating means for sequentially creating a plurality of divisional requests from each received request, each divisional request specifying a partial server resource constituting a server resource which is stored in the server apparatus; a request transmitting means for transmitting the created divisional requests to the server apparatus; and a managing means for managing a margin time for each of the received requests, the margin time being a result of subtracting (a) a time required for transmitting data of a given size to the client terminal apparatus, from (b) a time required for receiving the data of the given size from the server apparatus, wherein the divisional request creating means creates the divisional requests so that a resource for a request with the shortest margin time among the received requests is preferentially obtained in accordance with the margin times managed by the managing means.

In the above dynamic proxy server apparatus, the managing means may further manage wait times which each are a time between an instant when a partial server resource corresponding to a divisional request is obtained from the server apparatus and an instant when the next divisional request is created, the divisional request creating means changes size of the partial server resources in accordance with wait times, and the managing means updates the wait times so that a resource for a request with the shortest margin time is preferentially obtained.

In the above dynamic proxy server apparatus, the divisional request creating means may increase size of the partial server resources as the wait times decrease, and decreases size of the partial server resources as the wait times increase.

In the above dynamic proxy server apparatus, the managing means may assign the wait times to the requests so that the wait times are proportionate to the margin times for the requests.

With the above construction, it is possible to divide a resource into a plurality of portions, transmit a plurality of divisional requests to the server apparatus in collaboration with other requests in accordance with the state of communication, and preferentially obtain a resource from the server apparatus.

The above dynamic proxy server apparatus may further comprise: a response receiving means for receiving responses from the server apparatus, the responses being partial server resources constituting a server resource; a buffer storage means for storing the received responses sequentially in a buffer; a divisional response creating means for creating divisional responses sequentially from the responses stored in the buffer, each divisional response being a partial proxy resource constituting a proxy resource which is composed of the responses stored in the buffer; and a response transmitting means for transmitting the divisional responses to the client terminal apparatus, wherein the divisional response creating means creates the divisional responses so that a resource with the longest margin time is preferentially transmitted in accordance with the margin times managed by the managing means.

In the above dynamic proxy server apparatus, the divisional response creating means may change size of the partial proxy resources in accordance with wait times, and the managing means updates the wait times so that a resource with the longest margin time is preferentially transmitted.

In the above dynamic proxy server apparatus, the divisional response creating means may decrease size of the partial proxy resources as the wait times decrease, and increases size of the partial proxy resources as the wait times increase.

With the above construction, it is possible to divide a resource stored in a buffer into a plurality of portions, transmit a plurality of divisional responses to the client terminal apparatus in collaboration with other requests in accordance with the state of communication, and preferentially transmit a resource to the client terminal apparatus.

In the above dynamic proxy server apparatus, the divisional response creating means may create a divisional response when size of a proxy resource is equal to or higher than a threshold value, and when the size is lower than the threshold values waits for the size to reach the threshold value before creating a divisional response.

With the above construction, it is possible to delay the time when a resource is transmitted. This reduces interruptions in data transfers.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows how resources are obtained via a proxy server apparatus in the embodiment of the present invention;

FIG. 3 is a functional block diagram showing the construction of the proxy server apparatus;

FIG. 4A shows the data structure of a session record constituting the session table;

FIG. 4B shows the data structure of a get request record constituting the get request table;

FIG. 4C shows the data structure of a band record constituting the band table:

FIG. 6 is a flowchart showing the procedure of the control process;

FIG. 22A shows a session table;

FIG. 22B shows a get request table;

DESCRIPTION OF THE PREFERRED EMBODIMENTS

Figure 1:
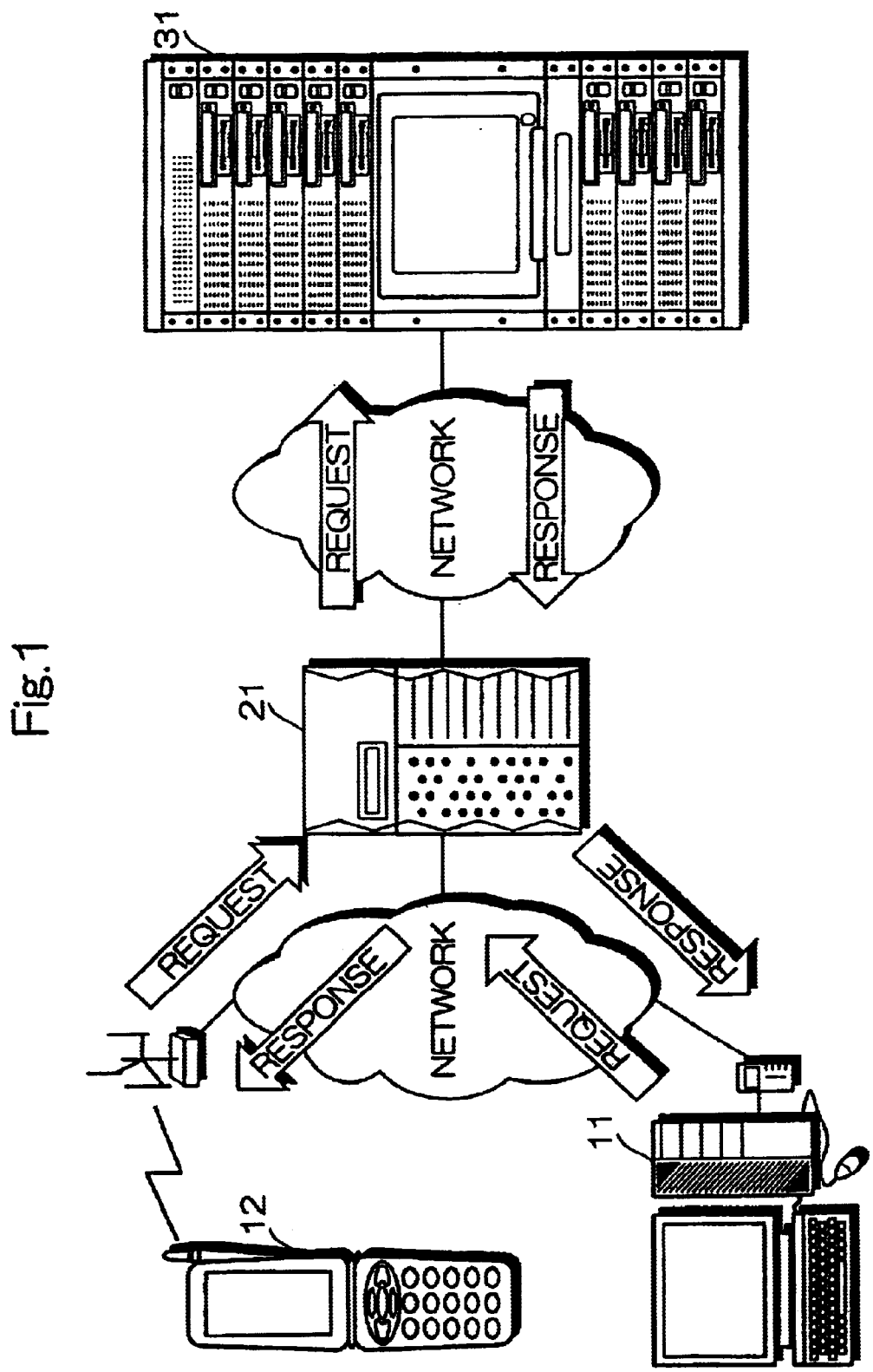
FIG. 1 shows how resources are obtained via a conventional proxy server apparatus.

The following is a description of the present invention through a specific embodiment thereof by way of referring to the drawings.

FIG. 2 shows how resources are obtained via a proxy server apparatus in the embodiment of the present invention.

As shown in FIG. 2, client terminal apparatuses 111 and 112, a proxy server apparatus 121, and a web server apparatus 131 are connected to each other via networks.

The client terminal apparatus ill is a personal computer including communicating devices such as: an input device such as a keyboard; an output device such as a display; a modem; and a router.

The client terminal apparatus 112 is a mobile telephone terminal apparatus that can be connected to the Internet. Because of downsizing and cost reduction, the capacity of a semiconductor memory of the client terminal apparatus 112 is small. The client terminal apparatus 112 does not include a magnetic recording medium.

The proxy server apparatus 121 is a computer that provides a proxy service, executing a proxy service program.

The web server apparatus 131 is a computer that provides a resource distribution service, executing a web service program. Note that the web server apparatus 131 stores a lot of web contents (hereinafter referred to as resources) in a recording medium therein in advance.

Note that the client terminal apparatuses 111 and 112, proxy server apparatus 121, and web server apparatus 131 receive/transmit resources in compliance with HTTP shown in RFC 2616.

The client terminal apparatus 111 obtains a resource from the web server apparatus 131 via the proxy server apparatus 121, by executing the following steps (1) to (10).

(1) The client terminal apparatus 111 sends a resource obtainment request (hereinafter referred to as get request) to the proxy server apparatus 121. It should be noted here that the get request is a request message including "GET", that a request message including "Range" is a get request including a byte range, and that a request message not including "Range" is a get request not including a byte range, where the byte range indicates a byte sequence range of the entity body of an HTTP entity which is represented by a byte sequence, and the byte sequence range is specified by (a) a first byte position (FBP) that is an offset for the first byte of the byte range, and (b) a last byte position (LBP) that is an offset for the last byte of the byte range The following are samples of the get requests, where SAMPLE 1 does not contain a byte range, and SAMPLE 2 contains a byte range.

SAMPLE-1
snprintf(ProxyREQ, sizeof(ProxyREQ),\"GET %s HTTP/1.1\r\n",URI);
SAMPLE-2
snprintf(ProxyREQ, sizeof(ProxyREQ),\"GET %s HTTP/1.1 Range=%d—%d\r\n", URI, FBP, LBP);

The proxy server apparatus 121 (2) receives the get request from the client terminal apparatus 111, (3) generates, by dividing the byte range included in the received get request into a plurality of divisional byte ranges, a plurality of get requests (hereinafter referred to as divisional get requests) that specify resource obtainment ranges corresponding to the divisional byte ranges, and (4) sends the divisional get requests to the web server apparatus 131.

The web server apparatus 131 (5) receives the divisional get requests from the proxy server apparatus 121, (6) obtains each portion of a resource specified in the get request from the recording medium storing the lot of resources, each resource portion corresponding to a divisional byte range, and sends each resource portion (hereinafter referred to as divisional get response) to the proxy server apparatus 121.

The proxy server apparatus 121 (7) receives the divisional get responses from the web server apparatus 131, (8) generates the resource (hereinafter referred to as get response) specified in the get request, using the divisional get responses, and (9) transmits the get response to the client terminal apparatus 111.

(10) The client terminal apparatus 111 receives the get response from the proxy server apparatus 121.

It should be noted here that the proxy server apparatus 121 stores the obtained get response in a recording medium therein for a certain period.

Construction of Proxy Server Apparatus 121

Now, the construction of the proxy server apparatus 121 that obtains a resource from the web server apparatus for the client terminal apparatuses 111 and 112 will be described.

FIG. 3 is a functional block diagram showing the construction of the proxy server apparatus 121.

As shown in FIG. 3, the proxy server apparatus 121 includes a request receiving unit 201, a request transmitting unit 202, a response receiving unit 203, a response transmitting unit 204, a resource storage unit 211, a table storage unit 212, a band measuring unit 221, a control unit 231, and a management unit 232.

The request receiving unit 201 receives a request message (hereinafter referred to as client request) from the client terminal apparatus, and sends the client request to the control unit 231, together with an IP address of the client terminal apparatus that has sent the client request.

The request transmitting unit 202 receives a request message (hereinafter referred to as proxy request) from the control unit 231, together with an IP address of the server apparatus (e.g., the web server apparatus 131) that is the destination of the proxy request, and sends the received proxy request to the server apparatus The response receiving unit 203 receives a resource (hereinafter referred to as server response) from the server apparatus, and sends the server response to the control unit 231, together with an IP address of the server apparatus.

The response transmitting unit 204 receives a resource (hereinafter referred to as proxy response) and the IP address of the client terminal apparatus from the control unit 231, and sends the proxy response to the client terminal apparatus.

The resource storage unit 211 stores a cache which is a group of resources having been obtained from the server apparatus and copied to either a semiconductor memory or a magnetic recording medium provided in the proxy server apparatus 121. The resource storage unit 211 (1) executes a resource reading process in accordance with a resource reading instruction received from the control unit 231, or (2) executes a resource writing process in accordance with a resource writing instruction received from the control unit 231, or (3) executes a resource checking process in accordance with a resource checking instruction received from the control unit 231.

In the resource writing process, the resource storage unit 211 receives a resource from the control unit 231 and adds the received resource to the cache. Note that when the received resource cannot be added to the cache, the resource storage unit 211 notifies the control unit 231 of a resource writing error.

In the resource reading process, the resource storage unit 211 copies a resource specified by the cache, and sends the copied resource to the control unit 231. Note that when the specified resource cannot be copied, the resource storage unit 211 notifies the control unit 231 of a resource reading error.

In the resource checking process, the resource storage unit 211 receives a proxy request from the control unit 231 and checks whether the resource specified by the proxy request is included in the cache and is valid. When judging that it is included in the cache and valid, the resource storage unit 211 sends "HIT" notification to the control unit 231. When the above is judged negatively, the resource storage unit 211 sends "MISS" notification to the control unit 231.

The table storage unit 212 stores a group of reference tables. When receiving a table writing instruction from the control unit 231, the table storage unit 212 receives data from the control unit 231 and stores the received data into the group of reference tables. When receiving a table reading instruction from the control unit 231, the table storage unit 212 reads from the group of reference tables data specified by the control unit 231 and sends the read data to the control unit 231. Here, the group of reference tables are referred to and updated by the control unit 231 when a request or response is transmitted or received. The group of reference tables will be described later with reference to FIG. 4.

The band measuring unit 221, when receiving from the control unit 231 a band measuring instruction and an IP address of the measuring target apparatus, measures the band of the specified apparatus and sends the measuring results (band) to the control unit 231. Here, a passive mode or an active mode can be used as the band measuring method.

In the passive mode, a packet (or data) of a certain size is transmitted to the apparatus with the specified IF address, the response time is measured, and the band is calculated.

In the active mode, a client side (the request receiving unit 201 and the response receiving unit 203) or a server side (the request transmitting unit 202 and the response transmitting unit 204) is monitored for a certain time period, the size of the data received or transmitted from/to the apparatus with the specified IP address and the time taken for the data transfers are measured, and the band is calculated.

The control unit 231, when receiving a client request from the request receiving unit 201, executes the request transmission process which will be described later. Also, the control unit 231, when receiving a server response from the response receiving unit 203, executes the response transmission process which will be described later.

The control unit 231 also refers to and updates the group of reference tables when executing the request transmission process or the response transmission process. The request transmission process will be described later with reference to FIGS. 9–11. The response transmission process will be described later with reference to FIGS. 12–14.

The management unit 232 executes a resource management process and a table management process as child processes as the proxy service program is started.

In the resource management process, the cache stored in the resource storage unit 211 is maintained. In this process, expired resources are deleted, for example.

In the table management process, the group of reference tables stored in the table storage unit 212 are maintained. The table management process will be described later with reference to FIGS. 19–21.

Up to now, the construction of the proxy server apparatus 121 has been described.

Group of Reference Tables

Now, the group of reference tables stored in the table storage unit 212 will be described.

The group of reference tables are a session table, a get request table, and a band table. These tables are stored in a semiconductor memory and a magnetic recording medium provided in the proxy server apparatus 121.

FIG. 4A shows the data structure of a session record constituting the session table. FIG. 4B shows the data structure of a get request record constituting the get request table. FIG. 4C shows the data structure of a band record constituting the band table.

As shown in FIG. 4A, the session record 301 is composed of fields 311–314.

The field 311 stores a time (hereinafter referred to as time stamp) which is obtained from a timer provided in the proxy server apparatus 121 when the session record is created.

The field 312 stores an identification number (hereinafter referred to as session identification number or SID) which is uniquely assigned to each session. The SID is managed by the proxy server program running on the proxy server apparatus 121. Here, the session indicates a logical connection between a client terminal apparatus and a server apparatus.

The field 313 stores an IP address (hereinafter referred to as CA) of a client terminal apparatus that has issued a request.

The field 314 stores an IP address (hereinafter referred to as SA) of a server apparatus which is an object of a request.

It should be noted here that when the control unit 231 receives a client request from the request receiving unit 201, the session record 301 is created by the control unit 231 only when a session is newly established. The created session record is sent from the control unit 231 to the table storage unit 212, together with a table writing instruction, and is added to the session table.

As shown in FIG. 4B, the get request record 302 is composed of fields 321–349.

The field 321 stores a time (hereinafter referred to as time stamp) which is obtained from a timer provided in the proxy server apparatus 121 when the get request record is created.

The field 322 stores an identification number (hereinafter referred to as get request identification number or GID) which is uniquely assigned each time a get request is received. The GID is managed by the proxy server program running on the proxy server apparatus 121.

The field 323 stores a session identification number which is assigned to a session for the received get request.

The field 324 stores a Request-URI (hereinafter referred to as URI) which is extracted from a get request.

The field 325 stores a flag (hereinafter referred to as divisional get request flag or SRQF) which indicates a divisional get request when the flag is on.

The field 326 stores a flag (hereinafter referred to as divisional get response flag or SRPF) which indicates a divisional get response when the flag is on.

The fields 331 to 333 respectively store a high limit band (hereinafter referred to as CHB), a low limit band (hereinafter referred to as CLB), and a virtual band (hereinafter referred to as CVB) of a client terminal apparatus that has issued a request.

The fields 335 to 337 respectively store a high limit band (hereinafter referred to as SHB), a low limit band (hereinafter referred to as SLB), and a virtual band (hereinafter referred to as SVB) of a server apparatus which is an object of a request.

The initial values for the high limit, low limit, and virtual bands are set by the user beforehand and written in the proxy service program and an initial setting file (hereinafter referred to as configuration file) that is read when the proxy service program is executed. The virtual band will be described later with reference to FIGS. 5A and 5B.

The field 341 stores a size (hereinafter referred to as resource size or RS) of a resource specified by an URI. Note that the initial value for the resource size is "0".

The field 342 stores a first byte position (FBP) of a resource specified by an URI. Note that the initial value for the FBP is the first byte in the byte range included in the get request, or "0" when the get request does not include the byte range.

The field 343 stores a last byte position (LBP) of a resource specified by an URI. Note that the initial value for the LBP is the last byte in the byte range included in the get request, or "0" when the get request does not include the byte range.

The field 344 stores a size (hereinafter referred to as received resource size or SRS) of a received resource specified by an URI. The initial value for the SRS, is "0".

The field 345 stores a size (hereinafter referred to as received resource size or SRS) of a transmitted resource specified by an URI. The initial value for the SRS is "0".

The field 346 stores a time interval (hereinafter referred to as sleep interval or SI) during which a process wait (hereinafter referred to as sleep) is performed, where the sleep is periodically performed. The initial value for SI is set by the user beforehand and written in the proxy service program and the configuration file that is read when the proxy service program is executed .

The field 347 stores a time period (hereinafter referred to as round-trip time or RTT) between the instant when a request is sent to the request transmitting unit 202 and the instant when a response to the request is received from the response receiving unit 203. The initial value for the RTT is "0".

The field 348 stores a margin (hereinafter referred to margin time or MT) between (a) a time taken for completing receiving of a resource with a given data size from a server apparatus and (b) a time taken for completing transmitting of the resource with the given data size to a client. The initial value for the MT is "0".

The field 349 stores a wait (priority) time (WT) which is required when a request or response is transmitted or received. The initial value for the WT is "0".

It should be noted here that the get request record 302 is created by the control unit 231 each time the control unit 231 receives a get request from the request receiving unit 201. The created get request record is sent from the control unit 231 to the table storage unit 212, together with a table writing instruction, and is added to the get request table.

As shown in FIG. 4C, the band record 303 is composed of fields 351–360.

The field 351 stores a time (hereinafter referred to as time stamp) which is obtained from a timer provided in the proxy server apparatus 121 when the band record is created.

The field 352 stores an IP address.

The field 353 stores a flag (hereinafter referred to as active mode flag or AF) which indicates either the active mode or passive mode.

The field 354 stores an expiration limit (hereinafter referred to as TTL) of a band record which is indicated by the IP address.

The fields 355 to 358 respectively store a physical band, a high limit band, a low limit band, and a virtual band of an apparatus indicated by the IP address.

The field 359 stores a protocol type (HTTP, FTP, SMTP, etc.) to which the band record indicated by the IP address can be applied.

The field 360 stores another IP address that indicates an apparatus (equivalent to a node in the middle of a path) related to the apparatus indicated by the above IP address.

It should be noted here that the band record 303 is created by the band measuring unit 221 each time it receives a band measuring instruction from the control unit 231. The created band record is sent from the band measuring unit 221 to the control unit 231, and also sent from the control unit 231 to the table storage unit 212, together with a table writing instruction, and is added to the get request table.

Virtual Band

Now, the virtual band will be described.

Figure 5A:
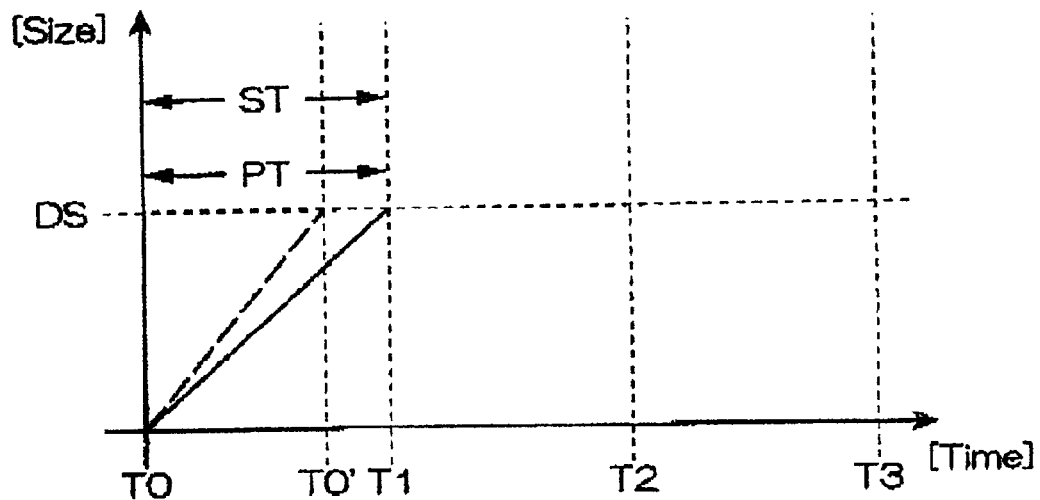
FIG. 5A is a graph showing the virtual band when there is no sleep.
Figure 5B:
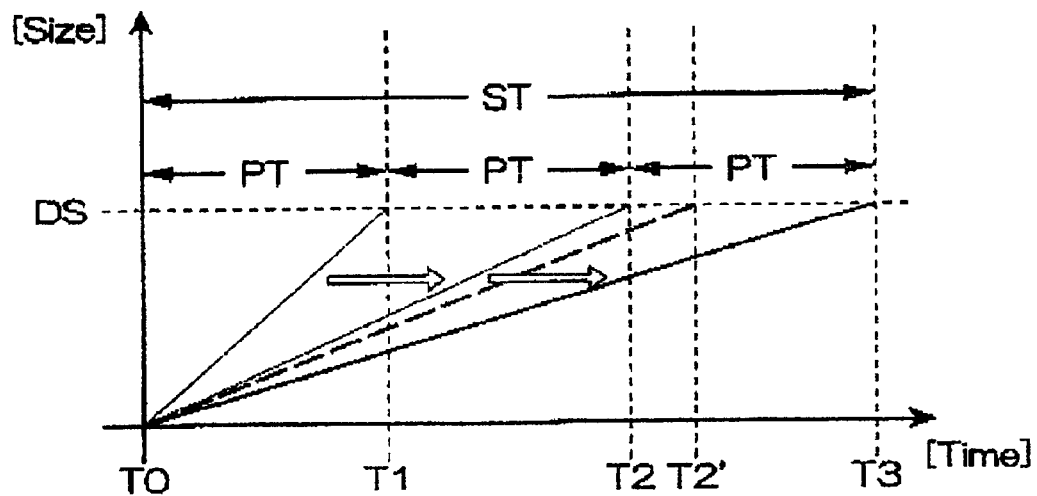
FIG. 5B is a graph showing the virtual band when there is a sleep.

FIG. 5 is a graph showing the virtual band when there is no sleep. FIG. 5B is a graph showing the virtual band when there is a sleep. The vertical axis represents a size, the horizontal axis a time, the solid line the virtual band, and the short dashed line the size of actually received data.

As shown in FIG. 5A, the control unit 231 starts receiving (transmitting) at time T0, where the start of a reception indicates that a request (divisional get request) having a given data size (DS) is sent to the request transmitting unit 202, and the start of a transmission indicates that a resource having a given data size (DS) is sent to the response transmitting unit 204. In reality, the response receiving unit 203 (the response transmitting unit 204) completes the reception (transmission) of the resource having the given data size (DS) at time T0'.

The control unit 231 sleeps for a given time period (PT), and determines at time T1 that it has completed the reception (transmission) of the resource having the given data size (DS).

From the above description, it is understood that the virtual band (VB) is obtained by the following expression.

$$VB = DS/ST = DS/PT = DS/(T1-T0) \qquad \text{EXP-A1}$$

As shown in FIG. 5B, the control unit 231 starts receiving (transmitting) at time T0, and in reality, the response receiving unit 203 (the response transmitting unit 204) completes the reception (transmission) of a resource having a given data size (DS) at time T2'.

The control unit 231 sleeps for a given time period (PT), and determines at time T2 that it has not completed the reception (transmission) of the resource having the given data size (DS). The control unit 231 sleeps again for the given time period (PT), and determines at time T3 that it has completed the reception (transmission) of the resource having the given data size (DS).

From the above description, it is understood that the virtual band (VB) is obtained by the following expression after the control unit 231 determines that it has completed the reception (transmission) of the resource having the given data size (DS) after it started the reception (transmission).

$$\text{Virtual band} = \text{a given data size/total sleep time} \qquad \text{EXP-A3}$$

$$\text{Total sleep time} = \text{the number of sleeps} * \text{a given time period} \qquad \text{EXP-A4}$$

The control unit 231 repeats sleeping until it determines that it has completed the reception (transmission) of the resource having the given data size (DS).

Operation of Proxy Server Apparatus 121

Now, the operation of the proxy server apparatus 121 will be described, focusing on the control unit 231 and the management unit 232.

Operation of Control Unit 231

FIG. 6 is a flowchart showing the procedure of controlling the transmission/reception of a request or a response by the control unit 231, As shown in FIG. 6, the control unit 231 repeats the steps S502 to S509 until the proxy service program stops running (step S501).

The control unit 231 receives a client request from the request receiving unit 201, together with an IP address of a client terminal apparatus that has issued the client request (step S502). The control unit 231 analyzes the received client request (step S503).

In step S504, the analysis result is checked. When the received client request is the get request, the URI is extracted from the client request (get request) (step S505). When the get request includes the byte range, the first byte position (FBP) and the last byte position (LBP) are also extracted from the request.

The control unit 231 sends a cache checking instruction and the extracted URI to the resource storage unit 211, instructing the resource storage unit 211 to check whether a specified resource is stored in the cache (step S506).

In step S507, the checking result is confirmed. When receiving the "HIT" notification from the resource storage unit 211, the control unit 231 executes, as a child process, a local request process which will be described later (step S508). When receiving the "MISS" notification from the resource storage unit 211, the control unit 231 executes, as a child process, a remote request process which will be described later (step S509).

When it is judged in step S504 that the received client request is other than the get request, the control unit 231 sends the received client request to the request transmitting unit 202 as a proxy request (step S510).

Local Request Process

The local request process is performed as follows. (L1) A resource reading instruction and the extracted URI are sent to the resource storage unit 211, with a specification of a resource to be read. (L2) The specified resource is received from the resource storage unit 211. (L3) A response transmission process, which will be described later, is executed.

In the above process, when a resource reading error is notified from the resource storage unit 211, an error notification is sent to the control process, and the local request process is ended.

Remote Request Process

The remote request process is performed as follows. (R1) A get request record (GRR) is newly created and initialized. (R2) A GRR updating process, which will be described later, is executed to update the created GRR, (R3) A table writing instruction and the updated GRR are sent to the table storage unit 212, instructing the table storage unit 212 to add the GRR to a get request table. (R4) A virtual band control process, which will be described later, is executed.

In the above process, when an error notification is received from the GRR updating process, an error notification is sent to the control process, and the remote request process is ended. The virtual band control process will be described later with reference to FIG. 8.

GRR Updating Process

In the GRR updating process, the resource size (GRR→RS) is updated using the first byte position (GRR→FBP) and the last byte position (GRR→LBP) in accordance with the following expression.

$$GRR{\rightarrow}RS = GRR{\rightarrow}LBP - GRR{\rightarrow}FBP + 1 \qquad \text{EXP-B1}$$

In the GRR updating process, it is then checked whether the resource size (GRR→RS) is "1". When it is judged positively, a head request process, which will be described later, is executed. The head request process will be described later with reference to FIG. 7.

In the GRR updating process, when the resource size (GRR→RS) satisfies the following conditional expression (EXP-J1) or when the resource is streaming data, the divisional request flag (GRR→SRQF) is turned on. When the resource size (GRR→RS) satisfies the following conditional expression (EXP-J2) or when the resource is streaming data, the divisional response flag (GRR→SRPF) is turned on.

$$GRR{\rightarrow}RS = GRR{\rightarrow}SHB * GRR{\rightarrow}SI \qquad \text{EXP-J1}$$

$$GRR{\rightarrow}RS = GRR{\rightarrow}CHB * GRR{\rightarrow}SI \qquad \text{EXP-J2}$$

In the GRR updating process, further, a table reading instruction is sent to the table storage unit 212 together with a band type number, an IP address, and a band specified in the band type number, for each band type of the client terminal apparatus and the server apparatus so that a band table is read. A band of a band record specified by the IP address and the band type number is stored in the band specified by the band type number, and is received. Here, the band type number indicates an identification number uniquely assigned to each of the high limit band, low limit band, and virtual band (e.g., HIGHBAND, LOWBAND, and VIRTUAL BAND).

Head Request Process

Now, the head request process will be described.

Figure 7:
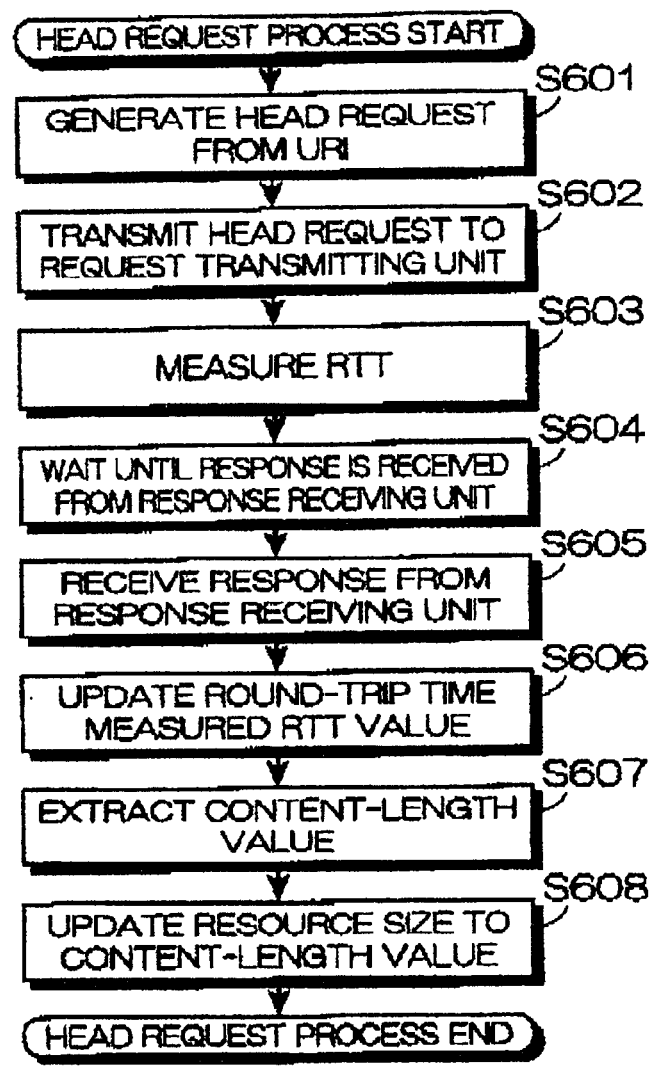
FIG. 7 is a flowchart showing the procedure of the head request process.

FIG. 7 is a flowchart showing the procedure of the head request process.

As shown in the drawing, the control unit 231 creates a head request using the URI extracted from the get request record (step S601). The control unit 231 then sends the created head request to the request transmitting unit 202 as a proxy request (step S602). The control unit 231 measures the RTT (Round-Trip Time) (step S603), and waits for a response (hereinafter referred to as head response) to the request to be sent from the response receiving unit 203 (step S604). Here, the RTT indicates a time period between the instant when a request is sent to the request transmitting unit 202 and the instant when a head response is received from the response receiving unit 203.

The control unit 231 receives the head response from the response receiving unit 203 (step S605), updates the round-trip time (GRR→RTT) to the measured RTT value (step S606), extracts the Content-Length value from the received head response (step S607), and updates the resource size (GRR→RS) to the extracted Content-Length value (step S608).

The following is an example of the head request.

SAMPLE-3 snprintf (ProxyREQ, sizeof (ProxyREQ),¥"HEAD %s HTTP/1.1¥r¥n",URI);

Virtual Band Control Process

Now, the virtual band control process will be described.

Figure 8:
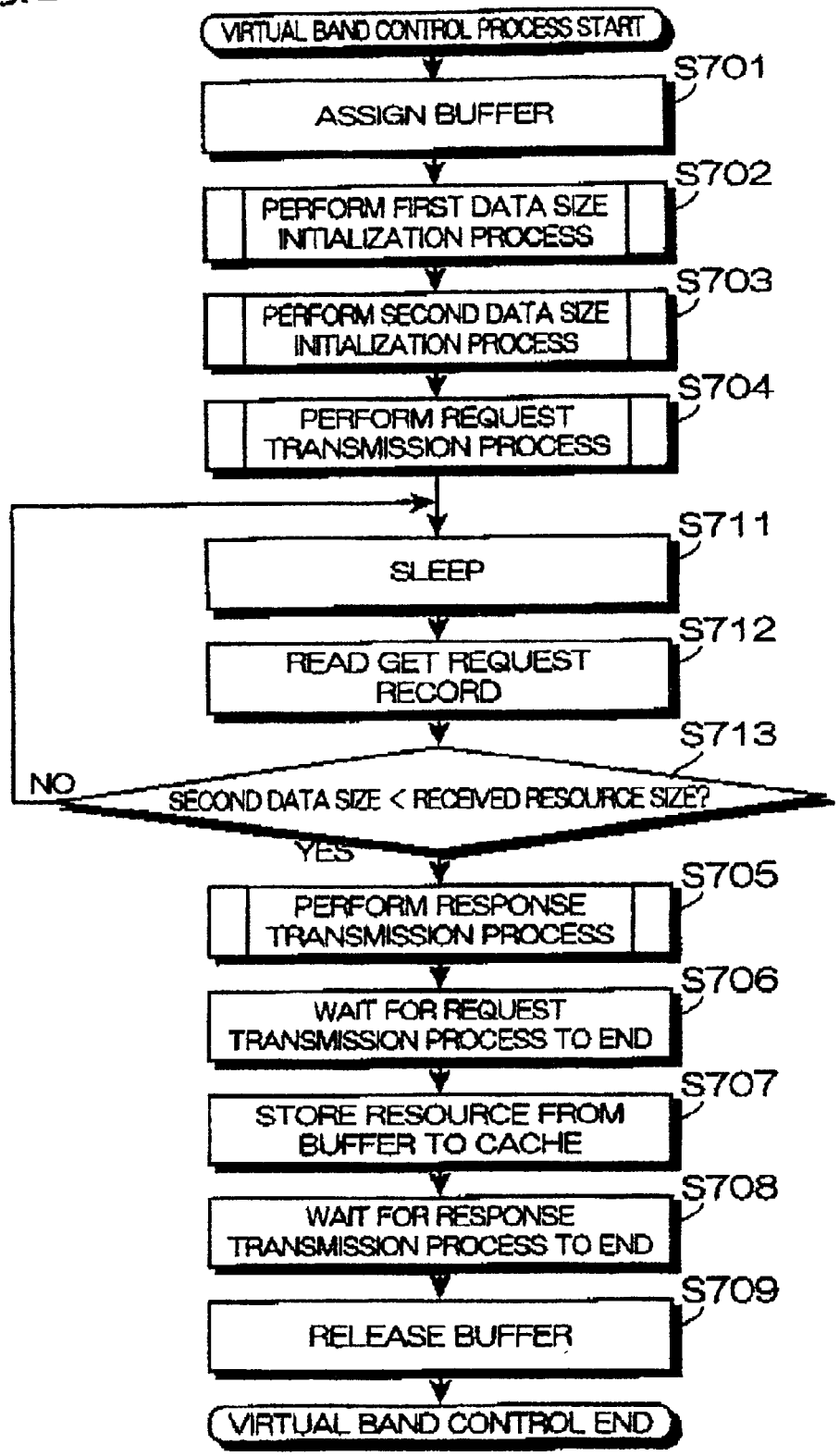
FIG. 8 is a flowchart showing the procedure of the virtual band control process.

FIG. 8 is a flowchart showing the procedure of the virtual band control process.

The control unit 231 assigns a work buffer (e.g., a buffer having the resource size (GRR→RS)) (step S701).

The control unit 231 performs a first data size initialization process which will be described later (step S702). In the first data size initialization process, a first byte position (BP1), a second byte position (BP2), and a data size (hereinafter referred to as first data size or DS1) of a resource that is to be completely received during the sleep interval (GRR→SI). Note that DS1 is always a positive value or "0" (unsigned).

The control unit 231 performs a second data size initialization process (step S703). In the second data size initialization process, a third byte position (BP3), a fourth byte position (BP4), and a data size (hereinafter referred to as second data size or DS2) of a resource that is to be completely transmitted during the sleep interval (GRR→SI). Note that DS2 is always a positive value or "0" (unsigned).

The control unit 231 then performs, as a child process, the request transmission process (step S704) which will be described later, and sleeps (step S711).

After the sleep interval (GRR→SI), the control unit 231 sends a table reading instruction to the table storage unit 212, sends a get request identification number (GRR→GID), receives the specified get request record, and updates the get request record (GRR) (step S712). The control unit 231 judges whether the received resource size (GRR→RRS) of the updated get request record (GRR) is equal to or larger than the second data size (DS2) (step S713).

When judging positively in step S713, the control unit 231 executes the response transmission process as a child process (step S705). When judging negatively in step S713, the control unit 231 returns to step S711 to repeat the steps.

The control unit 231 waits for the request transmission process to end (step S706), sends a resource writing instruction to the resource storage unit 211 together with a resource stored in the buffer, instructing the resource storage unit 211 to store the resource into the cache (step S707).

The control unit 231 then waits for the response transmission process to end (step S708), and releases the buffer (step S709).

Request Transmission Process

Now, the request transmission process will be described.

Figure 9:
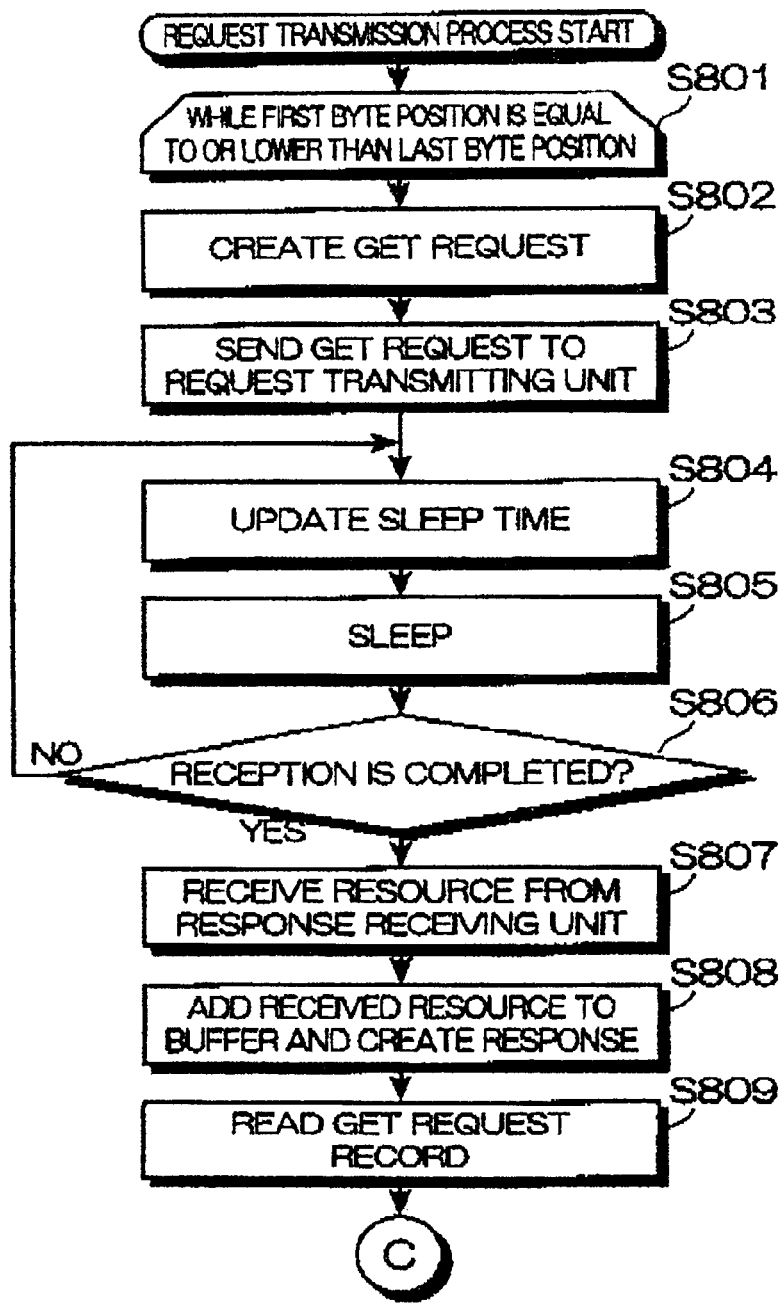
FIG. 9 is the first portion of a flowchart showing the procedure of the request transmission process.
Figure 10:
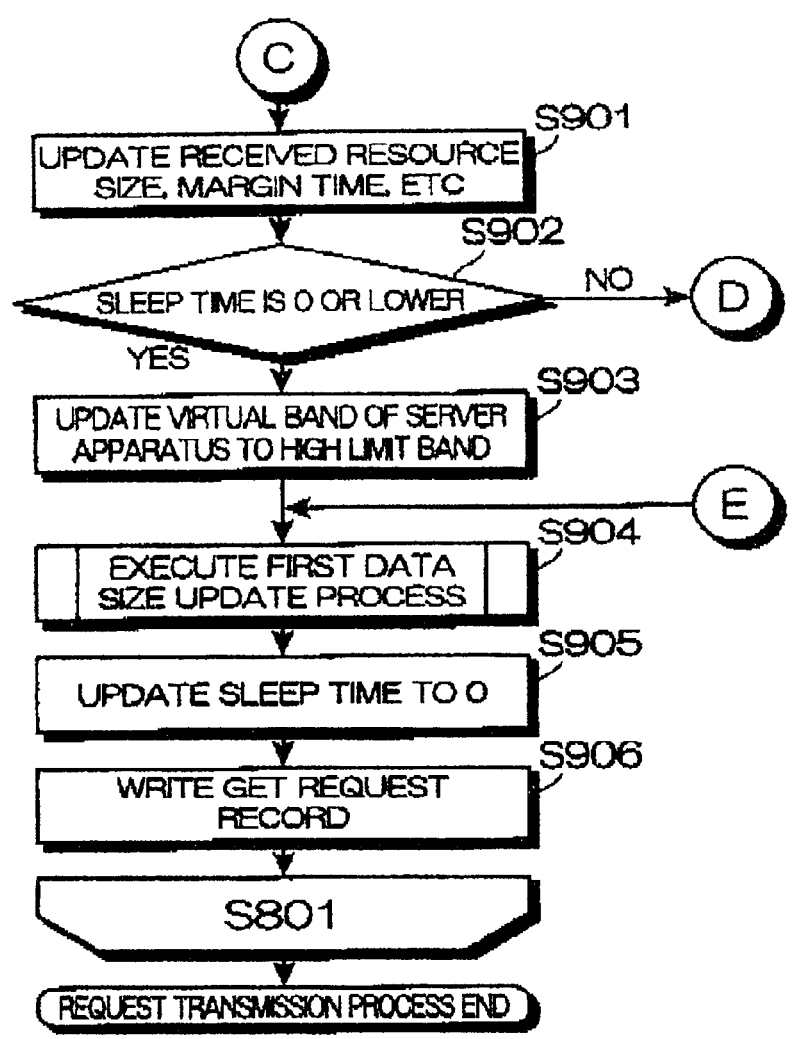
FIG. 10 is the second portion of the flowchart showing the procedure of the request transmission process.
Figure 11:
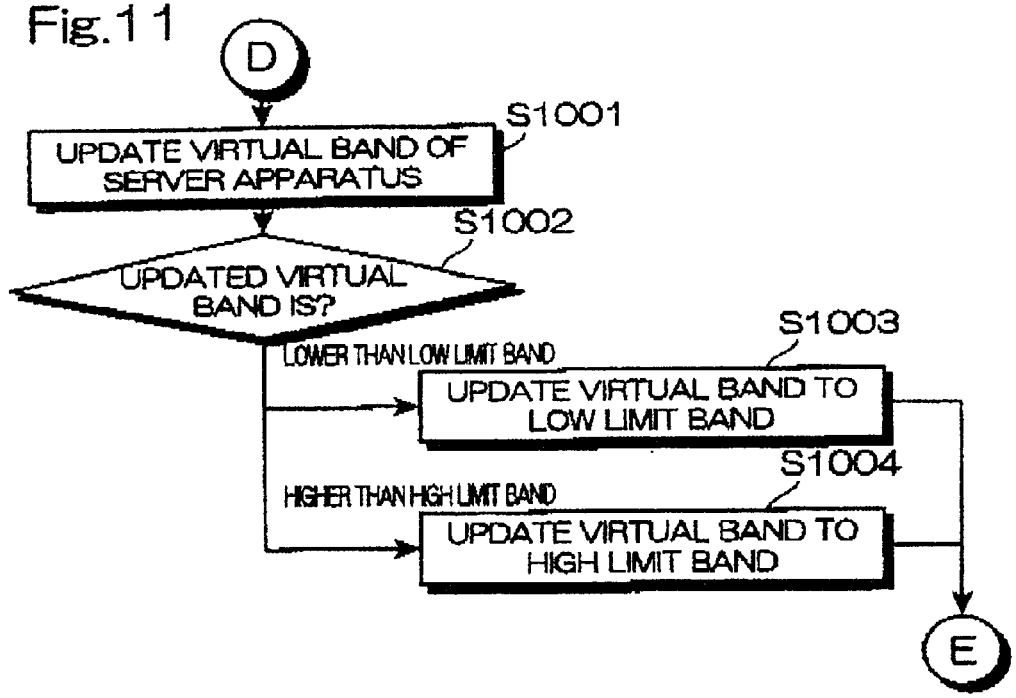
FIG. 11 is the third portion of the flowchart showing the procedure of the request transmission process.

FIGS. 9–11 are flowcharts showing the procedure of the request transmission process.

The control unit 231 repeats the steps S802 to S906 while the first byte position (BP1) is equal to or lower than the last byte position (GRR→LBP) (step S801).

The control unit 231 generates a divisional get request by recognizing the first byte position (FBP) of the byte range as the first byte position, and recognizing the last byte position (LBP) of the byte range as the second byte position (step S802), and sends the generated divisional get request to the request transmitting unit 202 as a proxy request (step S803).

The control unit 231 then updates the total sleep time (hereinafter referred to as reception sleep time or ST1), which is a total of the sleep time before the reception of the resource is completed, based on the following expression EXP-F1 (step S804), sleeps (step S805), and after the sleep interval (GRR→SI), judges whether the reception is completed (step S806).

$$ST1=ST1+GRR \rightarrow SI \qquad \text{EXP-F1}$$

When judging positively in step S806, the control unit 231 receives from the response receiving unit 203 the resource that has completely been received (step S807), adds the received resource to the buffer and creates the response (resource) for the client terminal apparatus (step S808). The control unit 231 sends a table reading instruction and a get request identification number (GRR→GID) to the table storage unit 212, instructing the table storage unit 212 to read the get request record indicated by the get request identification number (GRR→GID), receives and updates the get request record (GRR) (step S809).

As shown in FIG. 10, the control unit 231 updates the received resource size (GRR→RRS) based on the following expression EXP-F2, updates the margin time (GRR→MT) based on the following expressions EXP-F3.1 to EXP-F3.3, and updates the reception sleep time (ST1) based on the following expression EXP-F4 (step S901).

$$GRR \rightarrow RRS = GRR \rightarrow RRS + DS1 \qquad \text{EXP-F2}$$

$$GRR \rightarrow MT = DRS*DVB/(GRR \rightarrow SVB*GRR \rightarrow CVB) \qquad \text{EXP-F3.1}$$

$$DRS = GRR \rightarrow RRS - GRR \rightarrow SRS \qquad \text{EXP-F3.2}$$

$$DVB = GRR \rightarrow SVB - GRR \rightarrow CVB \qquad \text{EXP-F3.3}$$

$$ST1 = ST1 + GRR \rightarrow MT \qquad \text{EXP-F4}$$

In step S902, the update results are confirmed. When the reception sleep time (ST1) is "0" or lower, the virtual band (GRR→SVB) is updated to the high limit band (GRR→SHB) (step S903).

The control unit 231 executes the first data size update process which will be described later (step S904). In this first data size update process, the first byte position (BP1), the second byte position (BP2), and the data size (DS1) of the resource that is to be completely received during the sleep interval (GRR→SI) are updated The control unit 231 then updates the reception sleep time (ST1) to "0" (step S905).

The control unit 231 sends a table writing instruction and the updated GRR to the table storage unit 212, instructing the table storage unit 212 to update a get request table (step S906).

As shown in FIG. 11, when it is judged negatively in step S902, control goes to step S1001 shown in FIG. 11 and the control unit 231 updates the virtual band (GRR→SVB) based on the following expression (step S1001).

$$GRR \rightarrow SVB = DS1/ST1 \qquad \text{EXP-F5}$$

In step S1002, the update results are confirmed. When the updated virtual band (GRR→SVB) satisfies the following conditional expression EXP-J3, the control unit 231 updates the virtual band (GRR→SVB) again based on the following expression EXP-F6 (step S1003).

$$GRR \rightarrow SVB < GRR \rightarrow SLB \qquad \text{EXP-J3}$$

$$GRR \rightarrow SVB = GRR \rightarrow SLB+1 \qquad \text{EXP-F6}$$

When the updated virtual band (GRR→SVB) satisfies the following conditional expression EXP-J4, the control unit 231 updates the virtual band (GRR→SVB) again based on the following expression EXP-F7 (step S1004).

$$GRR \rightarrow SVB < GRR \rightarrow SHB \qquad \text{EXP-J4}$$

$$GRR \rightarrow SVB = GRR \rightarrow SHB-1 \qquad \text{EXP-F7}$$

Response Transmission Process

Figure 12:
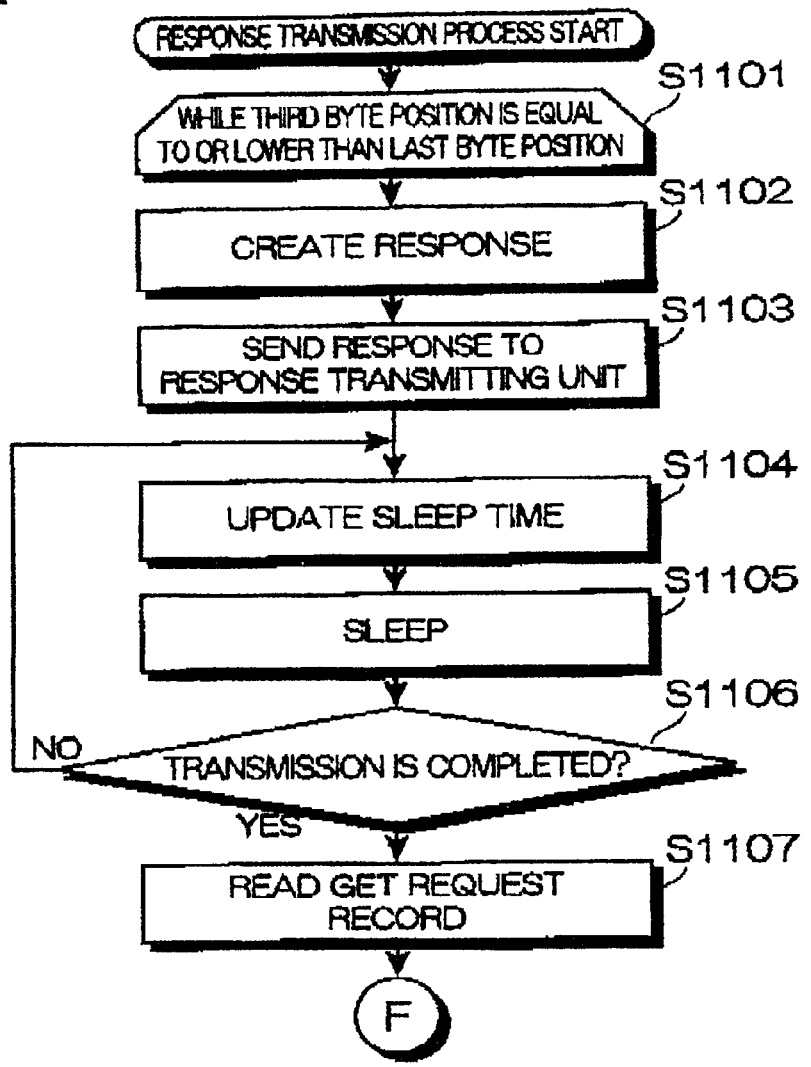
FIG. 12 is the first portion of a flowchart showing the procedure of the response transmission process.
Figure 13:
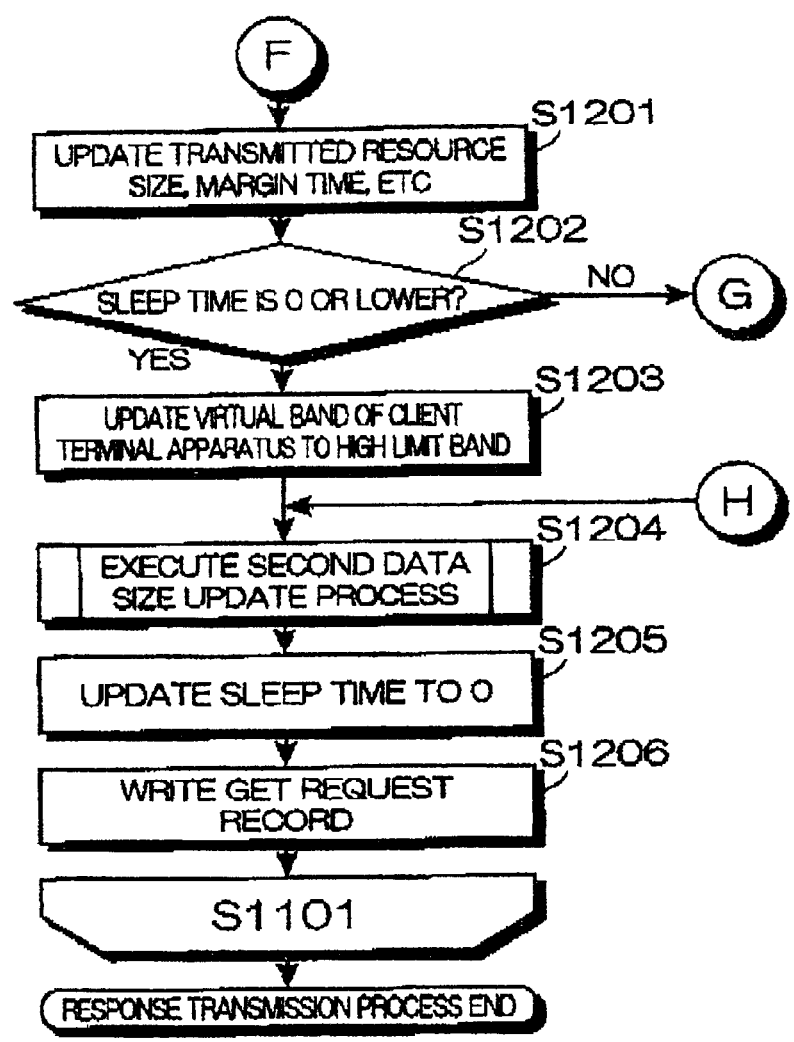
FIG. 13 is the second portion of the flowchart showing the procedure of the response transmission process.
Figure 14:
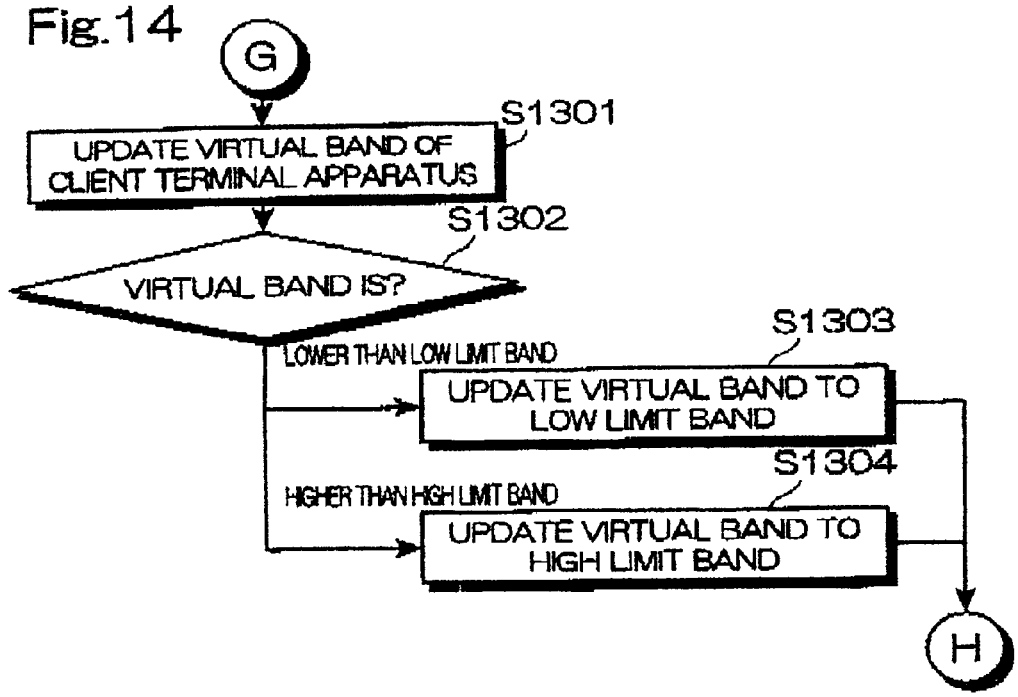
FIG. 14 is the third portion of the flowchart showing the procedure of the response transmission process.

Now, the response transmission process will be described. FIGS. 12–14 are flowcharts showing the procedure of the response transmission process.

The control unit 231 repeats the steps S1102 to S1206 while the third byte position (BP3) is equal to or lower than the last byte position (GRR→LBP) (step S1101).

The control unit 231 generates a divisional response by recognizing the first byte position (FBP) of the byte range as the third byte position, and recognizing the last byte position (LBP) of the byte range as the fourth byte position (step S1102), and sends the generated divisional response to the response transmitting unit 204 as a proxy response (step S1103).

The control unit 231 then updates the sleep time (ST2) based on the following expression EXP-G1 (step S1104), sleeps (step S1106), and after the sleep interval (G→SI), judges whether the transmission is completed (step S1106).

$$ST2 = ST2 + GRR \rightarrow SI \qquad \text{EXP-G1}$$

When judging positively in step S1106, the control unit 231 sends a table reading instruction to the table storage unit 212, sends a get request identification number (GRR→GID), instructing the table storage unit 212 to read a get retest record indicated by the get request identification number (GRR→GID), receives the specified get request record, and updates the get request record (GRR) (step S1107).

As shown in FIG. 13, the control unit 231 updates the transmission resource size (GRR→SRS) based on the following expression EXP-G2, updates the margin time (GRR→MT) based on the expressions EXP-F3.1 to EXP-F3.3, and updates the sleep time (ST2) based on the following expression EXP-G4 (step S1201).

$$GRR \rightarrow SRS = GRR \rightarrow SRS + DS2 \qquad \text{EXP-G2}$$

$$ST2 = ST2 + GRR \rightarrow MT \qquad \text{EXP-G4}$$

In step S1202, the update results are confirmed. When the reception sleep time (ST2) is "0" or lower, the virtual band (GRR→CVB) is updated to the high limit band (GRR→CHB) (step S1203).

The control unit 231 executes the second data size update process which will be described later (step S1204). In this second data size update process, the third byte position data (BP3), the fourth byte position data (BP4), and the second data size (DS2) are updated. The control unit 231 then updates the sleep time (ST2) to "0" (step S1205).

The control unit 231 sends a table writing instruction and the updated GRR to the table storage unit 212, instructing the table storage unit 212 to update a get request table (step S1206).

When it is judged negatively in step S1202, control goes to step S1301 shown in FIG. 14, and the control unit 231 updates the virtual band (GRR→CVB) based on the following expression (step S1301).

$$GRR{\to}CVB{=}DS2/ST2 \qquad \text{EXP-G5}$$

In step S1302, the update results are confirmed. When the updated virtual band (GRR→CVB) satisfies the following conditional expression EXP-J5, the control unit 231 updates the virtual band (GRR→CVB) again based on the following expression EXP-G6 (step S1303).

$$GRR{\to}CVB{<}GRR{\to}CLB \qquad \text{EXP-J5}$$

$$GRR{\to}CVB{=}GRR{>}CLB{+}1 \qquad \text{EXP-G6}$$

When the updated virtual band (GRR→CVB) satisfies the following conditional expression EXP-J6, the control unit 231 updates the virtual band (GRR→CVB) again based on the following expression EXP-G7 (step S1304).

$$GRR{\to}CVB{<}GRR{\to}CHB \qquad \text{EXP-J6}$$

$$GRR{\to}CVB{=}GRR{\to}CHB{-}1 \qquad \text{EXP-G7}$$

First Data Size Initialization

Now, the first data size initialization process will be described.

Figure 15:
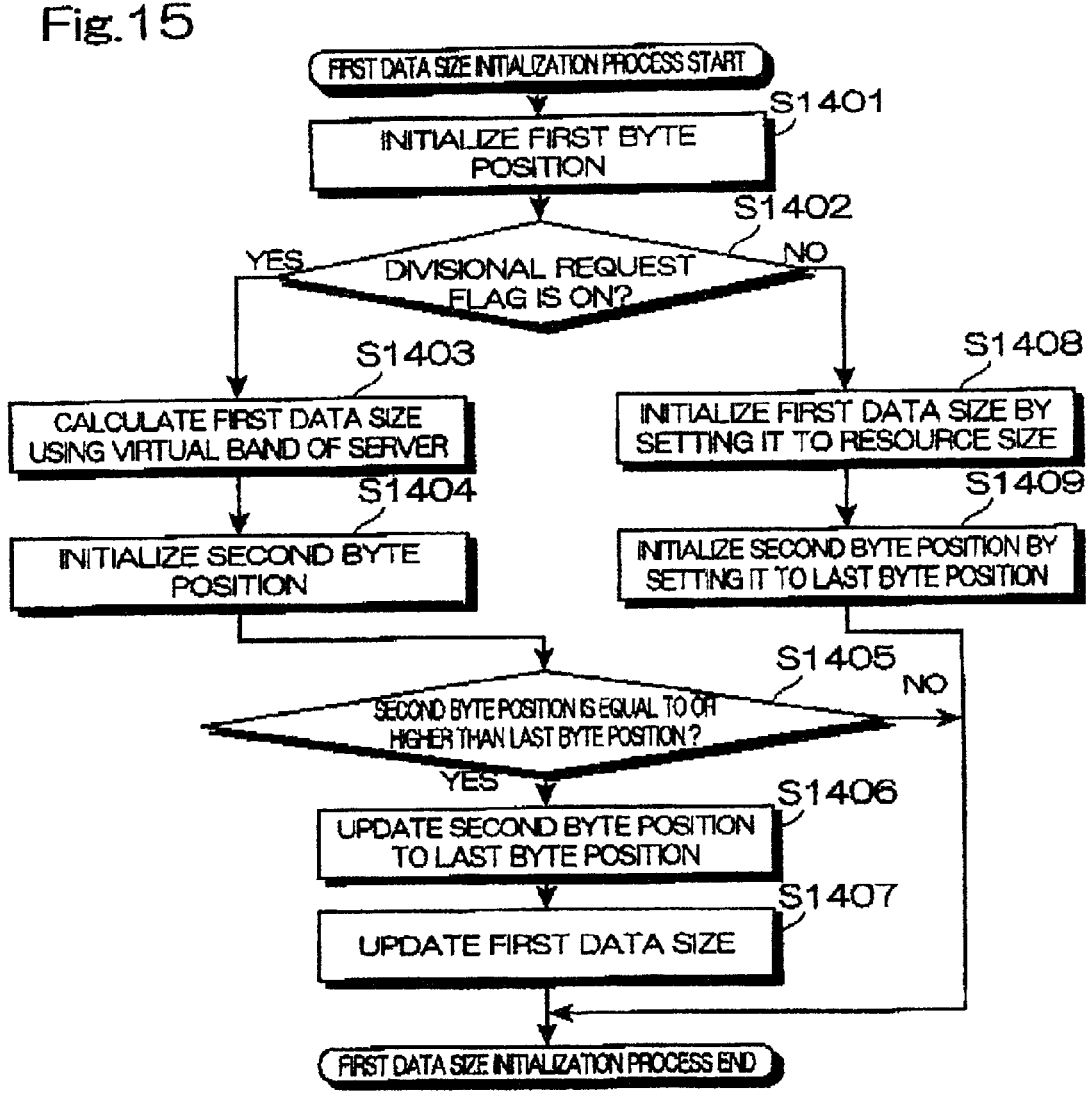
FIG. 15 is a flowchart showing the procedure of the first data size initialization process.

FIG. 15 is a flowchart showing the procedure of the first data size initialization process.

The control unit 231 initializes the first byte position by setting the first byte position (BP1) to the first byte position (GRR→FBP) (step S1401).

The control unit 231 then judges whether the divisional request flag (GRR→SRQF) is on (step S1402). When it is judged positively, the control unit 231 calculates the virtual band (GRR>SVB) of the server apparatus and the first data size (DS1) based on the following expression (step S1403).

$$DS1{=}GRR{\to}SHB^{*}(GRR{\to}SI{+}GRR{\to}RTT{-}GRR{\to}WT) \qquad \text{EXP-X1}$$

The control unit 231 initializes the second byte position (BP2) based on the following expressing using the first byte position (BP1) and the calculated first data size (DS1) (step S1404).

$$BP2{=}BP1{+}DS1{-}1 \qquad \text{EXP-X2}$$

The control unit 231 judges whether the second byte position (BP2) is equal to or higher than the last byte position (GRR→LBP) (S1405). When it is judged positively, the control unit 231 updates the second byte position (BP2) to the last byte position (GRR→LBP) (S1406). The control unit 231 then updates the calculated first data size (DS1) based on the following expression using the first byte position (BP1) and the second byte position (BP2) (step S1407). With this step, the first data size initialization process ends.

$$DS1{=}BP2{-}BP1{+}1 \qquad \text{EPX-X3}$$

When it is judged negatively in step S1402, the control unit 231 initializes the first data size (DS1) by setting the first data size (DS1) to the resource size (GRR→RS) (step S1408). The control unit 231 then initializes the second byte position (BP2) by setting the second byte position (BP2) to the last byte position (GRR→LBP) (step S1409). With this step, the first data size initialization process ends.

Second Data Size Initialization

Now, the second data size initialization process will be described.

Figure 16:
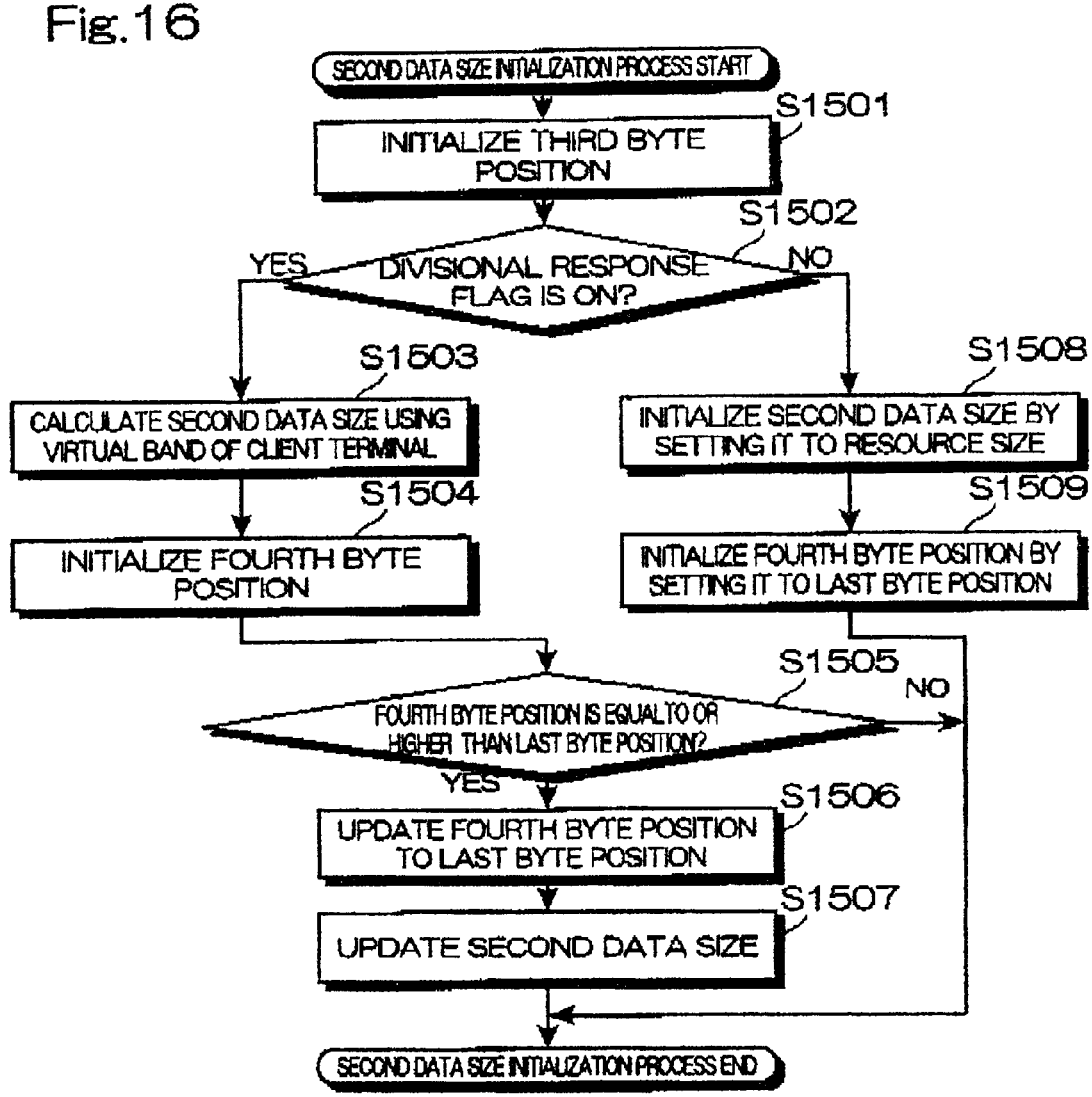
FIG. 16 is a flowchart showing the procedure of the second data size initialization process.

FIG. 16 is a flowchart showing the procedure of the second data size initialization process.

The control unit 231 initializes the third byte position by setting the third byte position (BP3) to the first byte position (GRR→FBP) (step S1501).

The control unit 231 then judges whether the divisional response flag (GRR→SRPF) is on (step S1502). When it is judged positively, the control unit 231 calculates the virtual band (GRR→CVB) of the client terminal apparatus and the second data size (DS2) based on the following expression (step S1503).

$$DS2{=}GRR{\to}CHB^{*}(GRR{\to}SI{+}GRR{\to}RTT{+}GRR{\to}WT) \qquad \text{EXP-Y1}$$

The control unit 231 initializes the fourth byte position (BP4) based on the following expressing using the third byte position (BP3) and the calculated second data size (DS2) (step S1504).

$$BP4{=}BP3{+}DS2{-}1 \qquad \text{EXP-Y2}$$

The control unit 231 judges whether the fourth byte position (BP4) is equal to or higher than the last byte position (GRR→LBP) (S1505). When it is judged positively, the control unit 231 updates the fourth byte position (BP4) to the last byte position (GRR→LBP) (S1506). The control unit 231 then updates the calculated second data size (DS2) based on the following expression using the third byte position (BP3) and the fourth byte position (BP4) (step S1507). With this step, the second data size initialization process ends.

$$DS2{=}BP4{-}BP3{+}1 \qquad \text{EXP-Y3}$$

When it is judged negatively in step S1502, the control unit 231 initializes the second data size (DS2) by setting the second data size (DS2) to the resource size (GRR→RS) (step S1508). The control unit 231 then initializes the fourth byte position (BP4) by setting the fourth byte position (BP4) to the last byte position (GRR→LBP) (step S1509). With this step, the second data size initialization process ends.

First Data Size Update Process

Now, the first data size update process will be described

Figure 17:
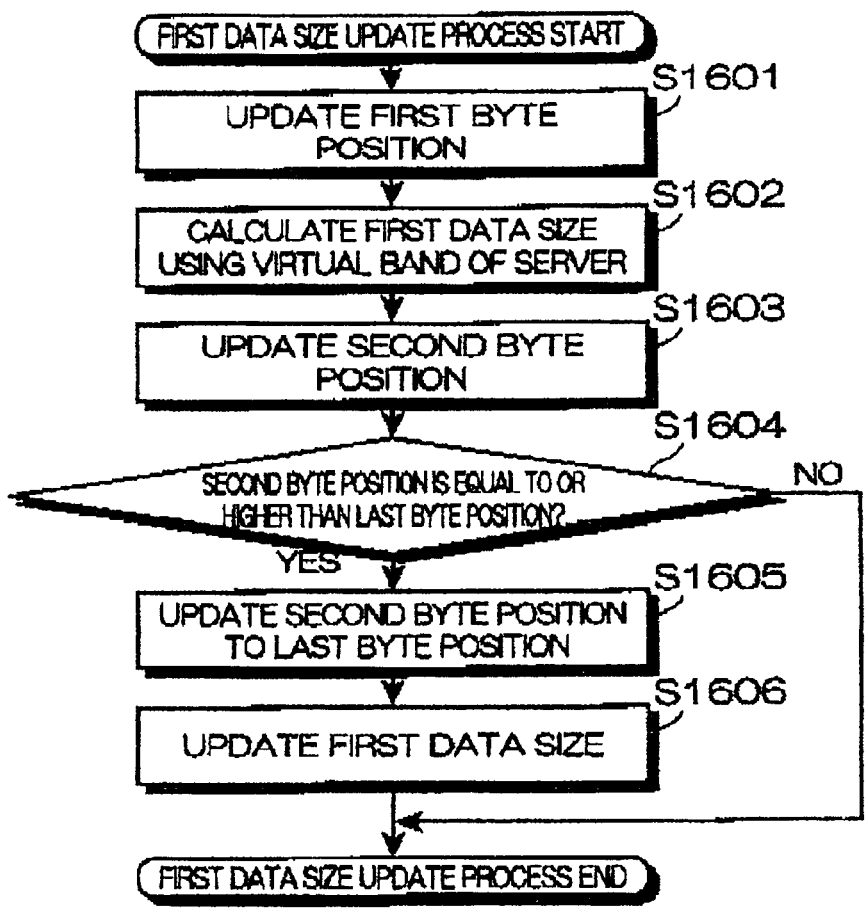
FIG. 17 is a flowchart showing the procedure of the first data size update process.

FIG. 17 is a flowchart showing the procedure of the first data size update process.

The control unit 231 updates the first byte position (BP1) to the second byte position (BP2) (step S1601).

The control unit 231 calculates the virtual band (GRR→SVB) and the first data size (DS1) based on the following expression EXP-X4 (step S1602), and updates the second byte position (BP2) based on the expression EXP-X2 using the first byte position (BP1) and the calculated first data size (DS1) (step S1603).

$$DS1{=}GRR{\to}SVB^{*}(GRR{\to}SI{+}GRR{\to}RTT{-}GRR{\to}WT) \qquad \text{EXP-X4}$$

The control unit 231 judges whether the second byte position (BP2) is equal to or higher than the last byte position (GRR→LBP) (S1604). When it is judged positively, the control unit 231 updates the second byte position (BP2) to the last byte position (GRR→LBP) (S1605). The control unit 231 then updates the calculated first data size (DS1) based on the expression EXP-X3 using the first byte position (BP1) and the second byte position (BP2) (step S1606). With this step, the first data size update process ends.

Second Data Size Update Process

Now, the second data size update process will be described.

Figure 18:
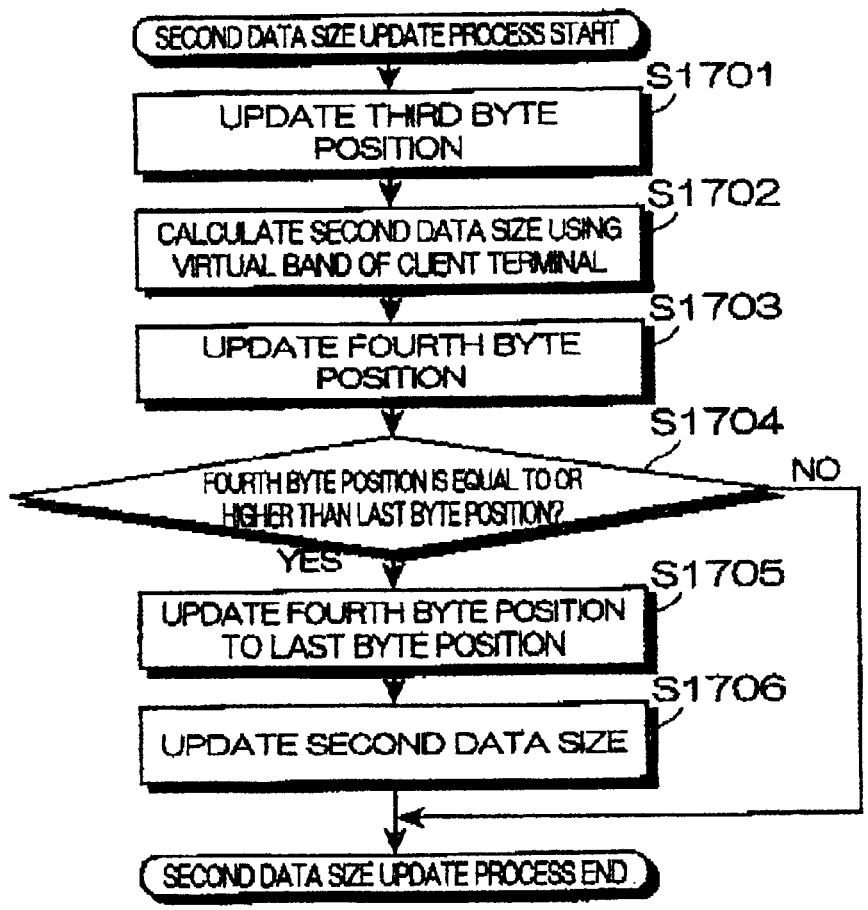
FIG. 18 is a flowchart showing the procedure of the second data size update process.

FIG. 18 is a flowchart showing the procedure of the second data size update process.

The control unit 231 updates the third byte position (BP3) to the fourth byte position (BP4) (step S1701).

The control unit 231 calculates the virtual band (GRR→CVB) and the second data size (DS2) based on the following expression EXP-Y4 (step S1702), and updates the fourth byte position (BP4) based on the expression EXP-Y2 using the third byte position (BP3) and the calculated second data size (DS2) (step S1703).

$$DS2=GRR\rightarrow CVB*(GRR\rightarrow SI+GRR\rightarrow RTT+GRR\rightarrow WT) \quad \text{EXP-X4}$$

The control unit 231 judges whether the fourth byte position (BP4) is equal to or higher than the last byte position (GRR→LBP) (S1704). When it is judged positively, the control unit 231 updates the fourth byte position (BP4) to the last byte position (GRR→LBP) (S1705). The control unit 231 then updates the calculated second data size (DS2) based on the expression EXP-Y3 using the third byte position (BP3) and the fourth byte position (BP4) (step S1706). With this step, the second data size update process ends.

Up to now, the operation of the control unit 231 has been described.

Operation of Management Unit 232

Figure 19:
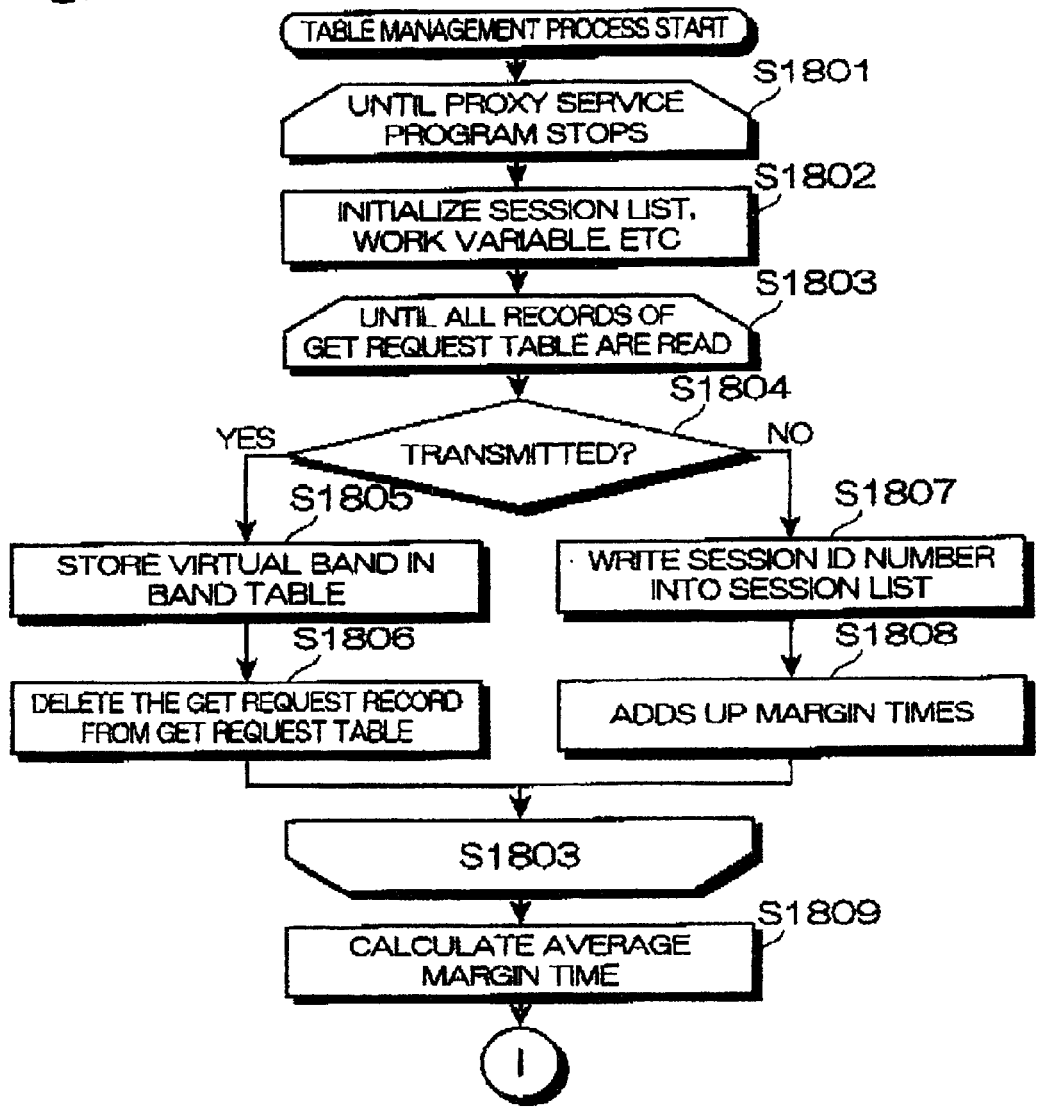
FIG. 19 is the first portion of a flowchart showing the procedure of the table management process.
Figure 20:
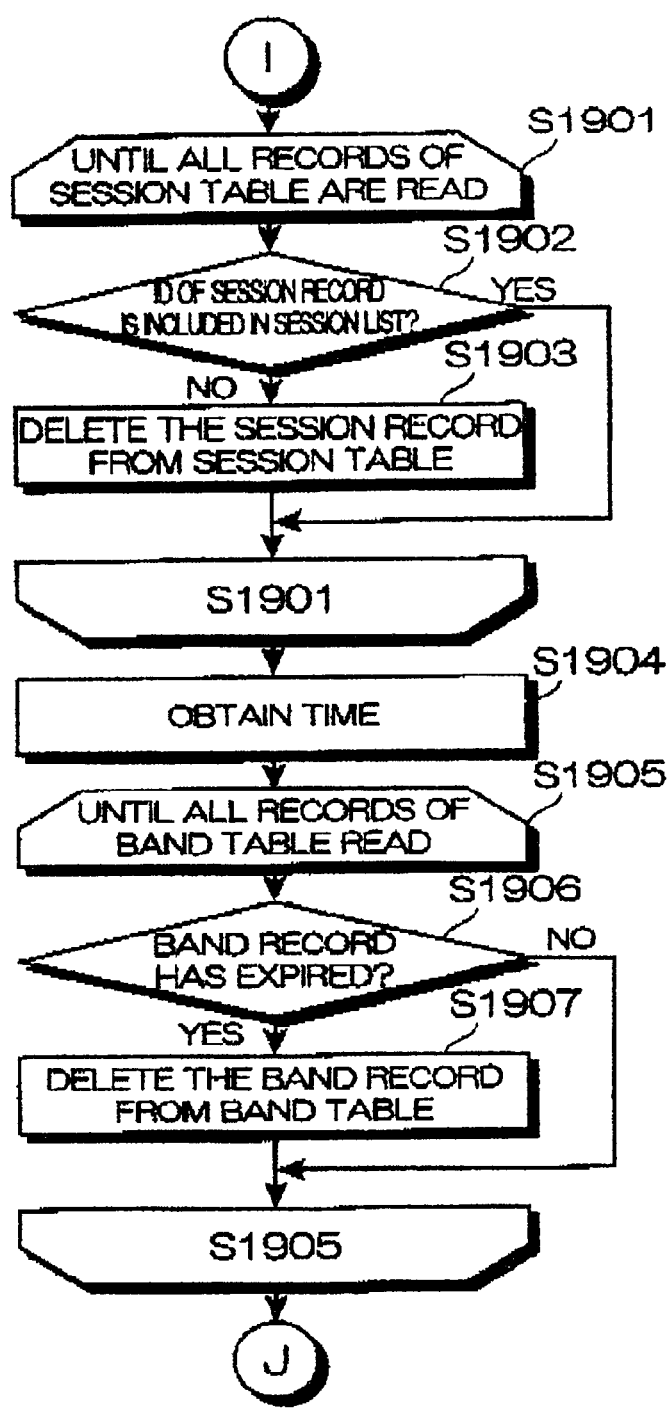
FIG. 20 is the second portion of the flowchart showing the procedure of the table management process.
Figure 21:
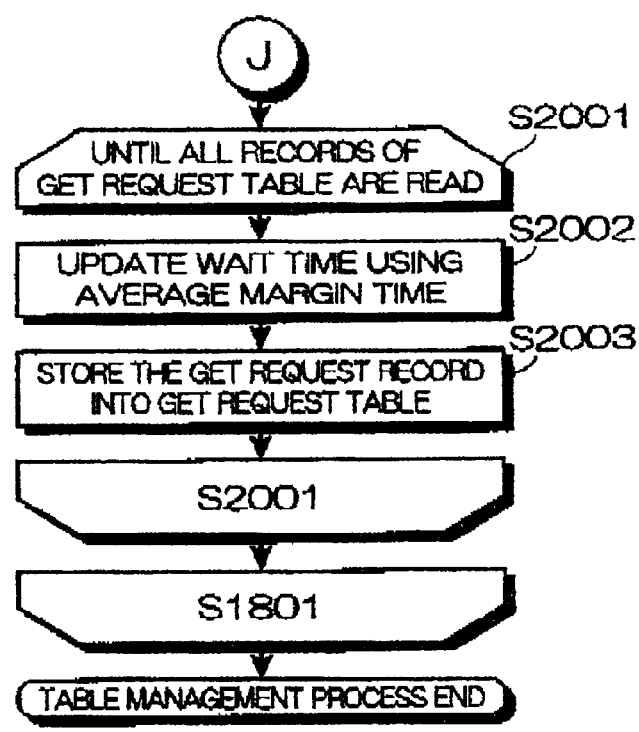
FIG. 21 is the third portion of the flowchart showing the procedure of the table management process.

FIGS. 19–21 are flowcharts showing the procedure of managing of the group of reference tables by the management unit 232.

The management unit 232 repeats the steps S1802 to S2003 until the proxy service program stops running (step S1801).

The management unit 232 initializes the session list, work variable and the like (step S1802).

The management unit 232 repeats the steps S1804 to S1808 until all records for a get request table are read (step S1803).

The management unit 232 judges from the resource size (GRR→RS) and the transmitted resource size (GRR→SRS) of a read get request record (GRR) whether a requested resource has been transmitted (step S1804).

When judging that the requested resource has been transmitted (the resource size is equivalent to the transmitted resource size), the management unit 232 stores the virtual bands (GRR→CVB and GRR→SVB) of the client terminal apparatus and the server apparatus into the band table (step S1805). The management unit 232 deletes the read get request record (GRR) from the get request table (step S1806).

When judging negatively in step S1804, the management unit 232 writes a session identification number (GRR→SID) into the session list (step S1807), and adds up the margin times (GRR→MT) into a work variable (step S1808).

The management unit 232 obtains an average of the margin times (hereinafter referred to as MTAV) from the work variable (step S1809).

As shown in FIG. 20, the management unit 232 repeats the steps S1902 to S1903 until all records for a session table are read (step S1901).

The management unit 232 searches a session list using as a search key the session identification number (SR→SID) of a read session record (SR) (step S1902).

When the session identification number (SR→SID) does not hit any entry in the session list, the management unit 232 deletes the read session record (SR) from the session table (step S1903).

The management unit 232 then obtains a time from a timer provided in the proxy server apparatus 121 (step S1904), and repeats the steps S1906 and S1907 until all records of a band table are read (step S1905).

The management unit 232 judges from the time stamp and TTL of a read band record and from the obtained time whether the read band record (BR) has expired (the expiration limit being TTL has been passed) (step S1906).

When judging positively, the management unit 232 deletes the read band record from the band table (step S1907).

As shown in FIG. 21, the management unit 232 repeats the steps S2002 and S2003 until all records are read from a get request table (step S2001).

The management unit 232 updates the wait time (GRR→WT) based on the following expression using the margin time (GRR→MT) of a read get request record (GRR) and the calculated average of margin times (MTAV) (step S2002).

$$GRR\rightarrow WT=GRR\rightarrow MT-MTAV \quad \text{EXP-Z1}$$

The management unit 232 stores into the get request table the get request record (GRR) including the updated wait time (GRR→WT) (step S2003).

Up to now, the operation of the management unit 232 has been described.

Priority

Now, an example of the group of reference tables managed by the management unit 232 will be described.

FIG. 22A shows a session table. FIG. 22B shows a get request table.

It should be noted here that a concrete example of band table will not be provided, but the band table is composed of, for example, (a) rows representing band records created by the band measuring unit 221 each time it receives a band measuring instruction from the control unit 231, and (b) columns representing fields of the band record 303 shown in FIG. 4C.

As shown in FIG. 22A, the rows represent session records created by the control unit 231 for each new session, and the columns represent fields of the session record 301 shown in FIG. 4A.

In this example shown in FIG. 22A, column 2101 represents the time stamp, column 2102 the session identification number (SID), column 2103 the IP address (CA) of the client terminal apparatus that has issued a request, and column 2104 the IP address (SA) of the server apparatus which is the object of the request.

As shown in FIG. 22B, the rows of the get request table represent get request records created by the control unit 231 for each new get request, and the columns represent fields of the get request record 302 shown in FIG. 4B.

In this example shown in FIG. 22B, column 2121 represents the time stamp, column 2122 the get request identification number (GID), column 2123 the session identification number (SID), column 2124 the URI (Uniform Resource Identifiers), the column 2125 the divisional get request flag (SRQF), the column 2148 the margin time (MT), and the column 2148 the wait time (WT).

The management unit 232 updates the wait time (WT) in response to the change of the margin time (MT).

Figure 23A:
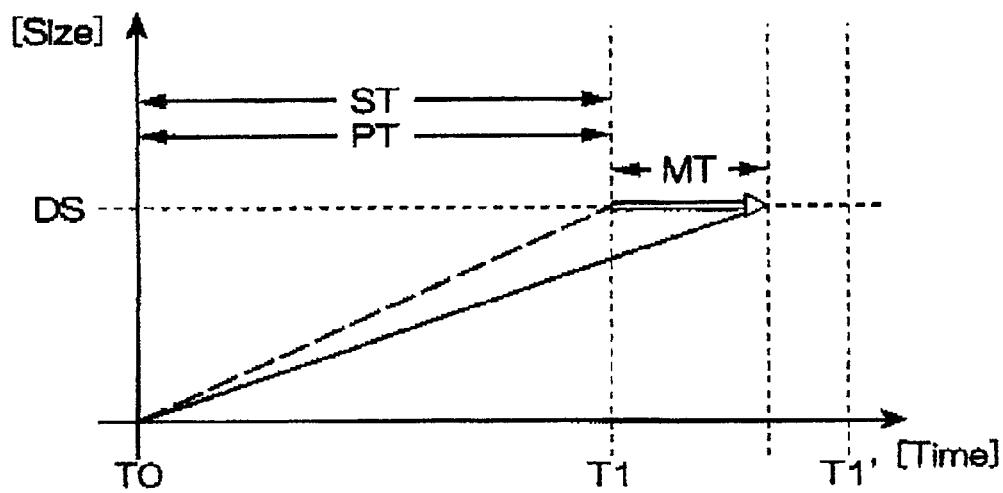
FIGS. 23A and 23B are graphs showing the virtual bands when the margin time is taken into account.
Figure 23B:
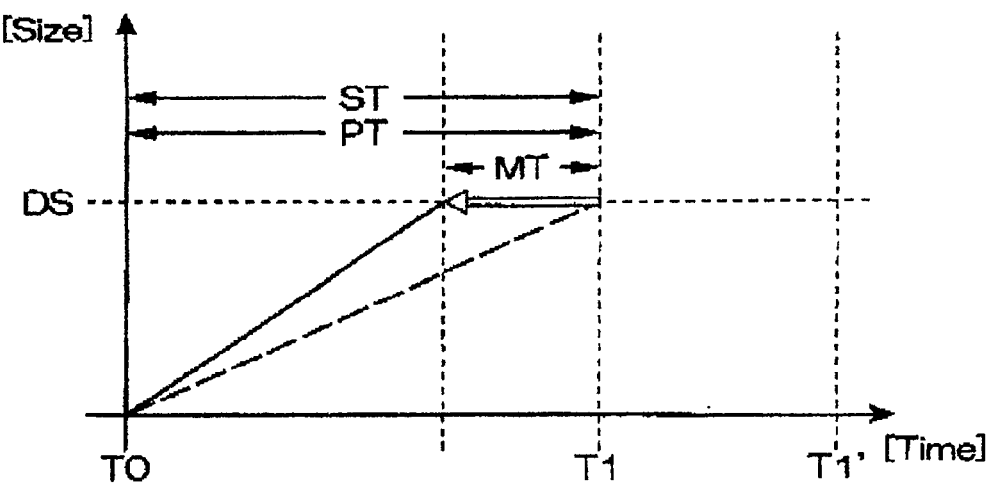

FIGS. 23A and 23B are graphs showing the virtual bands when the margin time is taken into account.

In FIG. 23A, the solid line represents the virtual band calculated using the expressions EXP-F4 and EXP-F5. In FIG. 23B, the solid line represents the virtual band calculated using the expressions EXP-G4 and EXP-G5. Also, in FIGS. 23A and 23B, the short dashed lines represent virtual bands when the margin time is not taken into account.

As apparent from FIGS. 23A and 23B, the virtual bands of the client terminal apparatus and the server apparatus increase or decrease as represented by the expressions EXP-F4, EXP-F5, EXP-G4, and EXP-G5 as the margin time increases or decreases, compared to the virtual bands in which the margin time is not taken into account.

The virtual band of the client terminal apparatus decreases when the margin time is a positive value, as indicated by the expressions EXP-F4 and EXP-F5. This case corresponds to the graph shown in FIG. 23A. In contrast, the virtual band of the server apparatus increases when the margin time is a negative value. This case corresponds to the graph shown in FIG. 23B.

In the above cases, the margin time being a positive value means that the server band (speed) is higher than the client band (speed), as indicated by the expressions EXP-F3.1 to EXP-F3.3; and the margin time being a negative value means that the server band (speed) is lower than the client band (speed), as indicated by the expressions EXP-F3.1 to EXP-F3.3, where the server band indicates the data transfer speed between the server apparatus and the proxy server apparatus, and the client band indicates the data transfer speed between the client terminal apparatus and the proxy server apparatus.

The control unit 231 suppresses the reception of a resource in the request transmission process and gives priority to the transmission of a resource in the response transmission process when the server band is higher than the client band. In contrast, the control unit 231 gives priority to the reception of a resource in the request transmission process and suppresses the transmission of a resource in the response transmission process when the server band is lower than the client band.

Figure 24A:
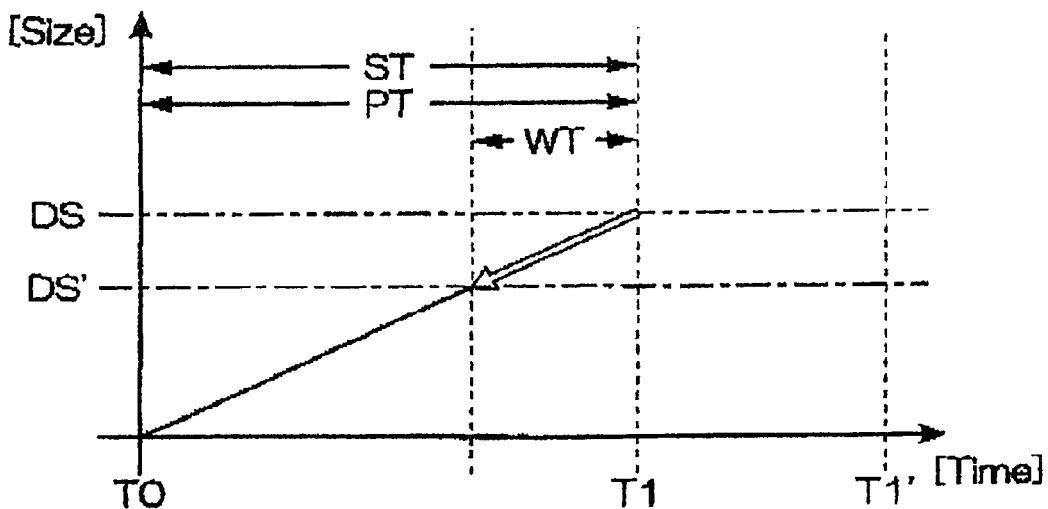
FIGS. 24A and 24B are graphs showing the virtual bands when the wait time is taken into account.
Figure 24B:
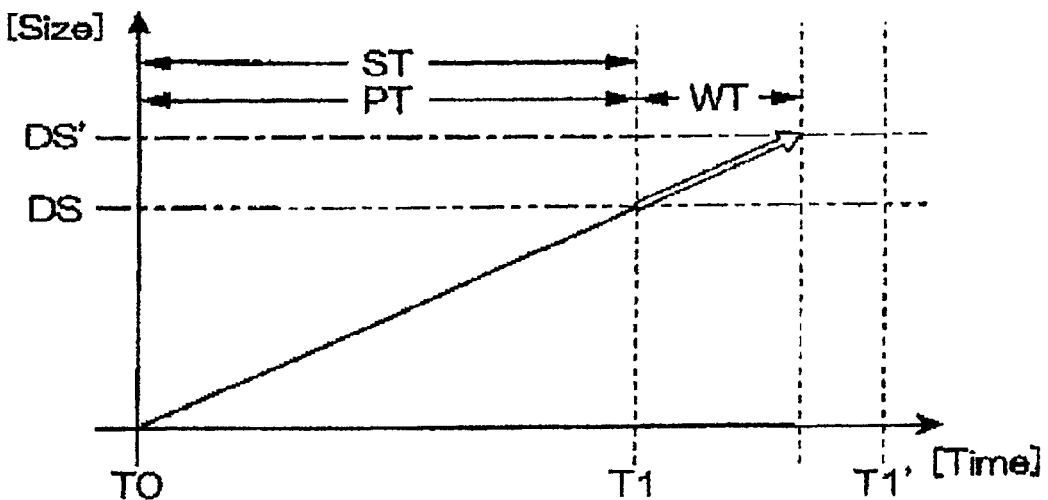

FIGS. 24A and 24B are graphs showing the virtual bands when the wait time is taken into account.

In FIG. 24A, the center line represents the data size (DS') calculated with the expression EXP-X1. In FIG. 24B, the center line represents the data size (DS') calculated with the expression EXP-Y1. In FIGS. 24A and 24B, the phantom lines represent data sizes when the wait time is not taken into account.

As apparent from FIGS. 24A and 24B, the data size of a resource that is received from the client terminal apparatus or sent to the server apparatus increases or decreases as represented by the expression EXP-X1 or EXP-Y1 as the wait time increases or decreases, compared to the data size in which the wait time is not taken into account.

The data size of a resource that is received from the server apparatus decreases when the wait time is a positive value, as indicated by the expression EXP-X1. This case corresponds to the graph shown in FIG. 24A. In contrast, the data size of a resource that is received from the server apparatus increases when the wait time is a negative value. This case corresponds to the graph shown in FIG. 24B.

In the above cases, the wait time being a positive value means that the present process has more time than the other request process, as indicated by the expression EXP-Z1; and the wait time being a negative value means that the present process has less time than the other request process.

The control unit 231 suppresses the reception of a resource in the request transmission process that has more sufficient time than the other request process, and gives priority to the transmission of a resource in the response transmission process. In contrast, the control unit 231 gives priority to the reception of a resource in the request transmission process that has less sufficient time than the other request process, and suppresses the transmission of a resource in the response transmission process.

In other words, the control unit 231 gives a lower priority to the reception of a resource in the request transmission process that has more sufficient time than the other request process, and gives a higher priority to the transmission of a resource. In contrast, the control unit 231 gives a higher priority to the reception of a resource in the request transmission process that has less sufficient time than the other request process, and gives a lower priority to the reception of a resource in another request transmission process.

Others

A proxy service program may be recorded in an optical recording medium (e.g., CD-ROM), a magnetic recording medium (e.g., hard disk), a magnet-optical recording medium (e.g., MO), or a semiconductor memory (e.g., ROM) so that the program can be executed on other computers. Also, a proxy service program may be recorded in a computer-readable recording medium such as a hard disk of a computer that is connected to a network, and may be transferred to another computer via the network so that the program can be executed on the other computer.

The band measuring unit 221 may receive a band table exchange request (hereinafter referred to as exchange request) from another proxy server apparatus and transfer it to the control unit 231. Upon receipt of the exchange request, the control unit 231 exchanges band tables stored in the table storage unit 212 so that the stored band tables reflect the exchanged band tables.

The child processes may be replaced with threads.

The expressions EXP-F4, EXP-X1, and EXP-X4 may be replaced with the following expressions EXP-F4a, EXP-X1a, AND EXP-X4a. Also, the expressions EXP-G4, EXP-Y1, and EXP-Y4 may be replaced with the following expressions EXP-G4a, EXP-Y1a, AND EXP-Y4a. This means that the data size which is given a priority (suppressed) when a resource is received (transmitted) may be calculated by replacing the margin time (MT) with the wait time (WT).

$$ST1 = ST1 + GRR \to WT \qquad \text{EXP-F4a}$$

$$DS1 = GRR \to SHB*(GRR \to SI + GRR \to RTT - GRR \to MT) \qquad \text{EXP-X1a}$$

$$DS1 = GRR \to SVB*(GRR \to SI + GRR \to RTT - GRR \to MT) \qquad \text{EXP-X4a}$$

$$ST2 = ST2 + GRR \to WT \qquad \text{EXP-G4a}$$

$$DS2 = GRR \to CHB*(GRR \to SI + GRR \to RTT + GRR \to MT) \qquad \text{EXP-Y1a}$$

$$DS2 = GRR \to CVB*(GRR \to SI + GRR \to RTT + GRR \to MT) \qquad \text{EXP-Y4a}$$

In the virtual band control process, the steps S712 and S713 may be replaced with a response transmission process as a child process after a time period (hereinafter referred to as trigger time or TT) which is obtained based on a fragmentation allowance number (hereinafter referred to as FAN) and the following expressions EXP-E1.1–E1.3, where FAN indicates the number of allowed transmissions after a transmission of a resource to a client terminal apparatus is fragmentized. The FAN is set by the user beforehand and written in the proxy service program and the configuration file that is read when the proxy service program is executed. Note that TT is always a positive value, "0", or an unsigned value.

$$TT = GRR \rightarrow SI - DHB * FRS/(GRR \rightarrow SHB * GRR \rightarrow CHB) \quad \text{EXP-E1.1}$$

$$DHB = GRR \rightarrow SHB - GRR \rightarrow CHB) \quad \text{EXP-E1.2}$$

$$FRS = GRR \rightarrow RS/FAN \quad \text{EXP-E1.3}$$

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A dynamic proxy server apparatus for, substituting for one of a plurality of client terminal apparatuses, obtaining a resource from a server apparatus, the dynamic proxy server apparatus comprising:
   a request receiving means for receiving a plurality of requests from at least one of the plurality of client terminal apparatuses;
   a divisional request creating means for sequentially creating a plurality of divisional requests from each received request, each divisional request specifying a partial server resource constituting a server resource which is stored in the server apparatus;
   a request transmitting means for transmitting the created divisional requests to the server apparatus; and
   a managing means for managing a margin time for each of the received requests, the margin time being a result of subtracting (a) a time required for transmitting data of a given size to the client terminal apparatus, from (b) a time required for receiving the data of the given size from the server apparatus, wherein
   the divisional request creating means creates the divisional requests so that a resource for a request with the shortest margin time among the received requests is preferentially obtained in accordance with the margin times managed by the managing means.

2. The dynamic proxy server apparatus of claim 1, wherein
   the managing means further manages wait times which each are a time between an instant when a partial server resource corresponding to a divisional request is obtained from the server apparatus and an instant when the next divisional request is created,
   the divisional request creating means changes size of the partial server resources in accordance with wait times, and
   the managing means updates the wait times so that a resource for a request with the shortest margin time is preferentially obtained.

3. The dynamic proxy server apparatus of claim 2, wherein
   the divisional request creating means increases size of the partial server resources as the wait times decrease, and decreases size of the partial server resources as the wait times increase.

4. The dynamic proxy server apparatus of claim 3, wherein
   the managing means assigns the wait times to the requests so that the wait times are proportionate to the margin times for the requests.

5. The dynamic proxy server apparatus of claim 4 further comprising:
   a response receiving means for receiving responses from the server apparatus, the responses being partial server resources constituting a server resource;
   a buffer storage means for storing the received responses sequentially in a buffer;
   a divisional response creating means for creating divisional responses sequentially from the responses stored in the buffer, each divisional response being a partial proxy resource constituting a proxy resource which is composed of the responses stored in the buffer; and
   a response transmitting means for transmitting the divisional responses to the client terminal apparatus, wherein
   the divisional response creating means creates the divisional responses so that a resource with the longest margin time is preferentially transmitted in accordance with the margin times managed by the managing means.

6. The dynamic proxy server apparatus of claim 5, wherein
   the divisional response creating means changes size of the partial proxy resources in accordance with wait times, and
   the managing means updates the wait times so that a resource with the longest margin time is preferentially transmitted.

7. The dynamic proxy server apparatus of claim 6, wherein
   the divisional response creating means decreases size of the partial proxy resources as the wait times decrease, and increases size of the partial proxy resources as the wait times increase.

8. The dynamic proxy server apparatus of claim 7, wherein
   the divisional response creating means creates a divisional response when size of a proxy resource is equal to or higher than a threshold value, and when the size is lower than the threshold value, waits for the size to reach the threshold value before creating a divisional response.

9. The dynamic proxy server apparatus of claim 2, wherein
   the managing means assigns the wait times to the requests so that the wait times are proportionate to the margin times for the requests.

10. The dynamic proxy server apparatus of claim 5, wherein
    the divisional response creating means creates a divisional response when size of a proxy resource is equal to or higher than a threshold value, and when the size is lower than the threshold value, waits for the size to reach the threshold value before creating a divisional response.

11. The dynamic proxy server apparatus of claim 1 further comprising:
    a response receiving means for receiving responses from the server apparatus, the responses being partial server resources constituting a server resource;
    a buffer storage means for storing the received responses sequentially in a buffer;
    a divisional response creating means for creating divisional responses sequentially from the responses stored in the buffer, each divisional response being a partial proxy resource constituting a proxy resource which is composed of the responses stored in the buffer; and
    a response transmitting means for transmitting the divisional responses to the client terminal apparatus, wherein the divisional response creating means creates the divisional responses so that a resource with the longest margin time is preferentially transmitted in accordance with the margin times managed by the managing means.

12. The dynamic proxy server apparatus of claim 11, wherein
the divisional response creating means creates a divisional response when size of a proxy resource is equal to or higher than a threshold value, and when the size is lower than the threshold value, waits for the size to reach the threshold value before creating a divisional response.

13. A dynamic proxy service program for, substituting for one of a plurality of client terminal apparatuses, obtaining a resource from a server apparatus, the dynamic proxy service program comprising:
a request receiving step for receiving a plurality of requests from at least one of the plurality of client terminal apparatuses;
a divisional request creating step for sequentially creating a plurality of divisional requests from each received request, each divisional request specifying a partial server resource constituting a server resource which is stored in the server apparatus;
a request transmitting step for transmitting the created divisional requests to the server apparatus; and
a managing step for managing a margin time for each of the received requests, the margin time being a result of subtracting (a) a time required for transmitting data of a given size to the client terminal apparatus, from (b) a time required for receiving the data of the given size from the server apparatus, wherein
the divisional request creating step creates the divisional requests so that a resource for a request with the shortest margin time among the received requests is preferentially obtained in accordance with the margin times managed by the managing step.

14. The dynamic proxy service program of claim 13, wherein
the managing step further manages wait times which each are a time between an instant when a partial server resource corresponding to a divisional request is obtained from the server apparatus and an instant when the next divisional request is created,
the divisional request creating step changes size of the partial server resources in accordance with wait times, and
the managing step updates the wait times so that a resource for a request with the shortest margin time is preferentially obtained.

15. The dynamic proxy service program of claim 14, wherein
the divisional request creating step increases size of the partial server resources as the wait times decrease, and decreases size of the partial server resources as the wait times increase.

16. The dynamic proxy service program of claim 15, wherein
the managing step assigns the wait times to the requests so that the wait times are proportionate to the margin times for the requests.

17. The dynamic proxy service program of claim 16 further comprising:
a response receiving step for receiving responses from the server apparatus, the responses being partial server resources constituting a server resource;
a buffer storage step for storing the received responses sequentially in a buffer;
a divisional response creating step for creating divisional responses sequentially from the responses stored in the buffer, each divisional response being a partial proxy resource constituting a proxy resource which is composed of the responses stored in the buffer; and
a response transmitting step for transmitting the divisional responses to the client terminal apparatus, wherein
the divisional response creating step creates the divisional responses so that a resource with the longest margin time is preferentially transmitted in accordance with the margin times managed by the managing step.

18. The dynamic proxy service program of claim 17, wherein
the divisional response creating step changes size of the partial proxy resources in accordance with wait times, and
the managing step updates the wait times so that a resource with the longest margin time is preferentially transmitted.

19. The dynamic proxy service program of claim 18, wherein
the divisional response creating step decreases size of the proxy resources as the wait times decrease, and increases size of the proxy resources as the wait times increase.

20. The dynamic proxy service program of claim 19, wherein
the divisional response creating step creates a divisional response when size of a proxy resource is equal to or higher than a threshold value, and when the size is lower than the threshold value, waits for the size to reach the threshold value before creating a divisional response.

21. The dynamic proxy service program of claim 14, wherein
the managing step assigns the wait times to the requests so that the wait times are proportionate to the margin times for the requests.

22. The dynamic proxy service program of claim 17, wherein
the divisional response creating step creates a divisional response when size of a proxy resource is equal to or higher than a threshold value, and when the size is lower than the threshold value, waits for the size to reach the threshold value before creating a divisional response.

23. The dynamic proxy service program of claim 13 further comprising:
a response receiving step for receiving responses from the server apparatus, the responses being partial server resources constituting a server resource;
a buffer storage step for storing the received responses sequentially in a buffer;
a divisional response creating step for creating divisional responses sequentially from the responses stored in the buffer, each divisional response being a partial proxy resource constituting a proxy resource which is composed of the responses stored in the buffer; and
a response transmitting step for transmitting the divisional responses to the client terminal apparatus, wherein
the divisional response creating step creates the divisional responses so that a resource with the longest margin time is preferentially transmitted in accordance with the margin times managed by the managing step.

24. The dynamic proxy service program of claim 23, wherein the divisional response creating step creates a divisional response when size of a proxy resource is equal to or higher than a threshold value, and when the size is lower than the threshold value, waits for the size to reach the threshold value before creating a divisional response.

25. A computer readable recording medium recording a dynamic proxy service program for, substituting for one or a plurality of client terminal apparatuses, obtaining a resource from a server apparatus, the dynamic proxy service program comprising:

a request receiving step for receiving a plurality of requests from at least one of the plurality of client terminal apparatuses;

a divisional request creating step for sequentially creating a plurality of divisional requests from each received request, each divisional request specifying a partial server resource constituting a server resource which is stored in the server apparatus;

a request transmitting step for transmitting the created divisional requests to the server apparatus; and a managing step for managing a margin time for each of the received requests, the margin time being a result of subtracting (a) a time required for transmitting data of a given size to the client terminal apparatus, from (b) a time required for receiving the data of the given size from the server apparatus, wherein the divisional request creating step creates the divisional requests so that a resource for a request with the shortest margin time among the received requests is preferentially obtained in accordance with the margin times managed by the managing step.

26. The recording medium of claim 25, wherein the managing step further manages wait times which each are a time between an instant when a partial server resource corresponding to a divisional request is obtained from the server apparatus and an instant when the next divisional request is created, the divisional request creating step changes size of the partial server resources in accordance with wait times, and the managing step updates the wait times so that a resource for a request with the shortest margin time is preferentially obtained.

27. The recording medium of claim 26, wherein the divisional request creating step increases size of the partial server resources as the wait times decrease, and decreases size of the partial server resources as the wait times increases.

28. The recording medium of claim 27, wherein the managing step assigns the wait times to the requests so that the wait times are proportionate to the margin times for the requests.

29. The recording medium of claim 28 further comprising:

a response receiving step for receiving responses from the server apparatus, the responses being partial server resources constituting a server resource;

a buffer storage step for storing the received responses sequentially in a buffer;

a divisional response creating step for creating divisional responses sequentially from the responses stored in the buffer, each divisional response being a partial proxy resource constituting a proxy resource which is composed of the responses stored in the buffer; and a response transmitting step for transmitting the divisional responses to the client terminal apparatus, wherein the divisional response creating step creates the divisional responses so that a resource with the longest margin time is preferentially transmitted in accordance with the margin times managed by the managing step.

30. The recording medium of claim 29, wherein the divisional response creating step changes size of the partial proxy resources in accordance with wait times, and the managing step updates the wait times so that a resource with the longest margin time is preferentially transmitted.

31. The recording medium of claim 30, wherein the divisional response creating step decreases size of the proxy resources as the wait times decrease, and increases size of the proxy resources as the wait times increase.

32. The recording medium of claim 31, wherein the divisional response creating step creates a divisional response when size of a proxy resource is equal to or higher than a threshold value, and when the size is lower than the threshold value, waits for the size to reach the threshold value before creating a divisional response.

33. The recording medium of claim 26, wherein the managing step assigns the wait times to the requests so that the wait times are proportionate to the margin times for the requests.

34. The recording medium of claim 29, wherein the divisional response creating step creates a divisional response when size of a proxy resource is equal to or higher than a threshold value, and when the size is lower than the threshold value, waits for the size to reach the threshold value before creating a divisional response.

35. The recording medium of claim 25 further comprising:

a response receiving step for receiving responses from the server apparatus, the responses being partial server resources constituting a server resource;

a buffer storage step for storing the received responses sequentially in a buffer;

a divisional response creating step for creating divisional responses sequentially from the responses stored in the buffer, each divisional response being a partial proxy resource constituting a proxy resource which is composed of the responses stored in the buffer; and a response transmitting step for transmitting the divisional responses to the client terminal apparatus, wherein the divisional response creating step creates the divisional responses so that a resource with the longest margin time is preferentially transmitted in accordance with the margin times managed by the managing step.

36. The recording medium of claim 35, wherein the divisional response creating step creates a divisional response when size of a proxy resource is equal to or higher than a threshold value, and when the size is lower than the threshold value, waits for the size to reach the threshold value before creating a divisional response.

37. A dynamic proxy server apparatus for, substituting for one of a plurality of client terminal apparatuses, obtaining a resource from a server apparatus, the dynamic proxy server apparatus comprising:

a response receiving means for receiving responses from the server apparatus, the responses being partial server resources constituting a server resource;

a buffer storage means for storing the received responses sequentially in a buffer;

a divisional response creating means for creating divisional responses sequentially from the responses stored in the buffer, each divisional response being a partial proxy resource constituting a proxy resource which is composed of the responses stored in the buffer; and a response transmitting means for transmitting the divisional responses to the client terminal apparatus, wherein the divisional response creating means creates a divisional response when size of a proxy resource is equal to or higher than a threshold value, and when the size is lower than the threshold value, waits for the size to reach the threshold value before creating a divisional response.

38. A dynamic proxy service program for, substituting for one of a plurality of client terminal apparatuses, obtaining a resource from a server apparatus, the dynamic proxy service program comprising:

a response receiving step for receiving responses from the server apparatus, the responses being partial server resources constituting a server resource;

a buffer storage step for storing the received responses sequentially in a buffer;

a divisional response creating step for creating divisional responses sequentially from the responses stored in the buffer, each divisional response being a partial proxy resource constituting a proxy resource which is composed of the responses stored in the buffer; and a response transmitting step for transmitting the divisional responses to the client terminal apparatus, wherein the divisional response creating step creates a divisional response when size of a proxy resource is equal to or higher than a threshold value, and when the size is lower than the threshold value, waits for the size to reach the threshold value before creating a divisional response.

39. A computer readable recording medium recording a dynamic proxy service program for, substituting for one of a plurality of client terminal apparatuses, obtaining a resource from a server apparatus, the dynamic proxy service program comprising:

a response receiving step for receiving responses from the server apparatus, the responses being partial server resources constituting a server resource;

a buffer storage step for storing the received responses sequentially in a buffer;

a divisional response creating step for creating divisional responses sequentially from the responses stored in the buffer, each divisional response being a partial proxy resource constituting a proxy resource which is composed of the responses stored in the buffer; and a response transmitting step for transmitting the divisional responses to the client terminal apparatus, wherein the divisional response creating step creates a divisional response when size of a proxy resource is equal to or higher than a threshold value, and when the size is lower than the threshold value, waits for the size to reach the threshold value before creating a divisional response.

* * * * *